(12) United States Patent
Kotera et al.

(10) Patent No.: US 8,917,434 B2
(45) Date of Patent: Dec. 23, 2014

(54) VIBRATING MIRROR ELEMENT AND METHOD FOR MANUFACTURING VIBRATING MIRROR ELEMENT

(75) Inventors: Hidetoshi Kotera, Kyoto (JP); Isaku Kanno, Hyogo (JP); Manabu Murayama, Osaka (JP); Hitoshi Fujii, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 269 days.

(21) Appl. No.: 13/519,580

(22) PCT Filed: Dec. 20, 2010

(86) PCT No.: PCT/JP2010/072856
§ 371 (c)(1),
(2), (4) Date: Jun. 27, 2012

(87) PCT Pub. No.: WO2011/081045
PCT Pub. Date: Jul. 7, 2011

(65) Prior Publication Data
US 2012/0320440 A1 Dec. 20, 2012

(30) Foreign Application Priority Data

Dec. 28, 2009 (JP) ................. 2009-297017

(51) Int. Cl.
*G02B 26/08* (2006.01)
*G02B 26/10* (2006.01)
(52) U.S. Cl.
CPC .......... *G02B 26/0841* (2013.01); *G02B 26/101* (2013.01); *G02B 26/0858* (2013.01)
USPC .................................... 359/224.1

(58) Field of Classification Search
CPC ............... G02B 26/08; G02B 26/0816; G02B 26/0833; G02B 26/0841; G02B 26/0858; G02B 26/10; G02B 26/101; G02B 26/105
USPC ......... 359/199.1, 223.1–226.1, 290, 291, 871
See application file for complete search history.

(56) References Cited

U.S. PATENT DOCUMENTS 6,327,855 B1   12/2001   Hill et al.
6,449,079 B1    9/2002   Herrmann
(Continued)

FOREIGN PATENT DOCUMENTS

DE    19857946 C1    1/2000
JP    2001068751 A   3/2001
(Continued)

OTHER PUBLICATIONS

Tani, et al., A Two-Axis Piezoelectric Tilting Micromirror with a Newly Developed PZT-Meandering Actuator, MEMS 2007: IEEE 20th International Conference on Micro Electro Mechanical Systems, Jan. 2007, p. 699-702, Kobe, Japan.

(Continued)

*Primary Examiner* — Euncha Cherry
(74) *Attorney, Agent, or Firm* — Baker Hostetler LLP

(57) ABSTRACT

There is provided a vibrating mirror element capable of inhibiting flexural deformation of a support portion. This vibrating mirror element (100) includes a mirror portion (10), a deformable driving portion (41, 43, 45, 51, 53, 55), and a support portion (42, 44, 46, 52, 54, 56) connected with a first connecting portion (41c, 43d, 45d, 51c, 53d, 55d) of the driving portion on the side of a first end portion (42a, 44a, 46a, 52a, 54a, 56a), while the thickness of the support portion is larger than the thickness of the driving portion.

20 Claims, 10 Drawing Sheets

(56) References Cited

U.S. PATENT DOCUMENTS

| | | |
|---|---|---|
| 6,486,995 B2 | 11/2002 | Nishikawa et al. |
| 6,718,764 B1 | 4/2004 | Sarkar et al. |
| 2005/0231787 A1* | 10/2005 | Tsuboi et al. .................. 359/290 |
| 2008/0225363 A1* | 9/2008 | Saitoh et al. .................. 359/199 |

FOREIGN PATENT DOCUMENTS

| | | |
|---|---|---|
| JP | 2002014298 A | 1/2002 |
| JP | 2002-328319 A | 11/2002 |
| JP | 2002372421 A | 12/2002 |
| JP | 2005-128147 A | 5/2005 |
| JP | 2005-148459 A | 6/2005 |
| JP | 2008257226 A | 10/2008 |
| JP | 2009223165 A | 10/2009 |
| WO | 2005059933 A1 | 6/2005 |

OTHER PUBLICATIONS

Extended European search report dated Jul. 22, 2013, 10 pp., from European patent application EP 10840903.8 with a filing date of Dec. 20, 2010, mailed from the European Patent Office, Munich, Germany.

International Search Report and Written Opinion for PCT/JP2010/072856, international filing date Dec. 10, 2010, mailed on Jun. 7, 2011.

* cited by examiner

VIBRATING MIRROR ELEMENT AND METHOD FOR MANUFACTURING VIBRATING MIRROR ELEMENT

CROSS-REFERENCE TO RELATED APPLICATIONS

The present application is a national stage entry of PCT/JP2010/072856, filed Dec. 20, 2010, which claims the benefit of Japanese Application Serial No. 2009-297017, filed Dec. 28, 2009.

TECHNICAL FIELD

The present invention relates to a vibrating mirror element and a method for manufacturing a vibrating mirror element, and more particularly, it relates to a vibrating mirror element including a driving portion and a method for manufacturing a vibrating mirror element including a driving portion.

BACKGROUND ART

In general, a vibrating mirror element including a driving portion and a method for manufacturing a vibrating mirror element including a driving portion are known. Such a vibrating mirror element and a method for manufacturing a vibrating mirror element are disclosed in Japanese Patent Laying-Open Nos. 2009-223165 and 2008-257226, for example.

In Japanese Patent Laying-Open No. 2009-223165, there is disclosed an optical deflector in which a pair of driving portions arranged along a direction X, a mirror portion arranged to be held between this pair of driving portions in the direction X and rotated by the pair of driving portions, and a frame arranged to surround the pair of driving portions and the mirror portion along the direction X and a direction Y (direction orthogonal to the direction X in the same plane) are formed on a common substrate. First end portions of the pair of driving portions of this optical deflector are connected with the mirror portion on a first side of the direction X and a second side thereof, respectively. Second end portions of the pair of driving portions are fixed by the frame located on sides opposite to the mirror portion in the direction X. The pair of driving portions are arranged such that a plurality of piezoelectric actuators extending in the direction Y are arranged in the direction X, and the plurality of piezoelectric actuators are continuously connected in a state where end portions of the plurality of piezoelectric actuators are bent. This optical deflector is so formed that the thickness of the mirror portion and the thickness of the frame are rendered larger by a prescribed height (thickness) than the thickness of each of the pair of driving portions and the thickness of each of the pair of driving portions is rendered substantially constant by removing portions corresponding to the pair of driving portions by the prescribed height (thickness).

In Japanese Patent Laying-Open No. 2008-257226, there is disclosed an optical deflector including a reflecting plate, four vibrating plates arranged in pairs on both sides of the reflecting plate in a direction X and extending in a direction Y (direction orthogonal to the direction X in the same plane), a first-side elastic support portion connecting first end portions of a pair of the vibrating plates arranged on a first side of the direction X and a first side of the reflecting plate in the direction X, and a second-side elastic support portion connecting first end portions of a pair of the vibrating plates arranged on a second side of the direction X and a second side of the reflecting plate in the direction X. This optical deflector is so configured that the thickness of each of the four vibrating plates is rendered smaller than the thickness of the first-side elastic support portion and the thickness of the second-side elastic support portion in order to easily deform the vibrating plates. Furthermore, the optical deflector is so configured that the first-side elastic support portion and the second-side elastic support portion extend in the direction X to incline the reflecting plate utilizing torsional deformation. Thus, the reflecting plate can be rotated about a rotation center extending in the direction Y.

PRIOR ART

Patent Document

Patent Document 1: Japanese Patent Laying-Open No. 2009-223165

Patent Document 2: Japanese Patent Laying-Open No. 2008-257226

SUMMARY OF THE INVENTION

Problems to be Solved by the Invention

However, in the optical deflector described in Japanese Patent Laying-Open No. 2009-223165, if regions of the driving portions provided with the piezoelectric actuators and regions of the driving portions (support portions) provided with no piezoelectric actuator are alternately arranged in the direction X, the rigidity (deformation amount with respect to external force) of the regions provided with no piezoelectric actuator and the rigidity of the regions provided with the piezoelectric actuators are conceivably substantially equal to each other since the thickness of each of the driving portions is substantially constant. The lower rigidity of the regions provided with the piezoelectric actuators is preferred in order to easily deform the piezoelectric actuators, and hence the rigidity of the regions provided with no piezoelectric actuator each having a thickness substantially equal to that of each of the regions provided with the piezoelectric actuators is conceivably low similarly to the rigidity of the regions provided with the piezoelectric actuators. Thus, there is such a problem that the regions provided with no piezoelectric actuator are easily flexurally deformed by the own weight of the driving portions and the mirror portion since the rigidity of the regions provided with no piezoelectric actuator is low.

In the optical deflector described in Japanese Patent Laying-Open No. 2008-257226, the first-side elastic support portion and the second-side elastic support portion must be torsionally deformed in order to incline the reflecting plate, and hence the rigidity of the first-side elastic support portion and the second-side elastic support portion must be conceivably low. Therefore, if the first-side elastic support portion and the second-side elastic support portion are configured to extend in the direction Y, there may be such a problem that the first-side elastic support portion and the second-side elastic support portion are easily flexurally deformed by the own weight of the reflecting plate and the pair of vibrating plates since the rigidity of the first-side elastic support portion and the second-side elastic support portion is low.

The present invention has been proposed in order to solve the aforementioned problems, and an object of the present invention is to provide a vibrating mirror element and a method for manufacturing a vibrating mirror element each capable of inhibiting flexural deformation of a support portion.

Means for Solving the Problems and Effects of the Invention

A vibrating mirror element according to a first aspect of the present invention includes a mirror portion, a deformable driving portion including a first connecting portion and linearly extending along a first direction, and a support portion connected with the first connecting portion of the driving portion on the side of a first end portion and linearly extending along the first direction, while the thickness of the support portion is larger than the thickness of the driving portion.

In the vibrating mirror element according to the first aspect of the present invention, as hereinabove described, the thickness of the support portion is rendered larger than the thickness of the driving portion. Thus, the rigidity of the support portion can be increased due to the thickness of the support portion larger than the thickness of the driving portion, and hence the support portion can be inhibited from flexural deformation even if the own weight of the driving portion or the like connected to the support portion is applied to the support portion. Furthermore, the thickness of the support portion is rendered larger than the thickness of the driving portion, whereby the width of the support portion can be reduced while the rigidity of the support portion is ensured. Thus, the overall size of the vibrating mirror element can be reduced.

Preferably in the aforementioned vibrating mirror element according to the first aspect, the support portion is configured to maintain an inclination at the first connecting portion of the driving portion when the driving portion is driven while deformed. According to this structure, the inclination of the support portion resulting from deformation of the driving portion can be maintained. In other words, the mirror portion can be inclined on the basis of the maintained inclination of the support portion when the mirror portion is connected to the support portion.

Preferably in this case, the driving portion is flexurally deformed to be driven, and the support portion is inhibited from flexural deformation to maintain the inclination at the first connecting portion of the driving portion. According to this structure, the support portion can reliably maintain the inclination at the first connecting portion of the driving portion resulting from the flexural deformation of the driving portion.

Preferably in the aforementioned vibrating mirror element according to the first aspect, the support portion includes a substrate, and includes a first portion having a first thickness and a second portion having a second thickness smaller than the first thickness, formed on the substrate, the driving portion is constituted by a third portion having the second thickness, and the support portion is so configured that the first portion and the second portion are stacked in a thickness direction to render the thickness of the support portion larger than the thickness of the third portion of the driving portion. According to this structure, the thickness of the support portion can be rendered larger by the first thickness of the first portion than the thickness of the driving portion. Furthermore, the second thickness is smaller than the first thickness, and hence the thickness of the support portion can be easily rendered larger than the thickness of the driving portion.

Preferably in the aforementioned vibrating mirror element according to the first aspect, the width of the support portion in a second direction orthogonal to the first direction is not more than the width of the driving portion in the second direction. According to this structure, the overall size of the vibrating mirror element in the second direction can be reduced while the thickness of the support portion is rendered larger than the thickness of the driving portion to ensure the rigidity of the support portion, as compared with a case where the vibrating mirror element is so configured that the width of the support portion is larger than the width of the driving portion.

Preferably in the aforementioned vibrating mirror element according to the first aspect, the support portion includes a mirror support portion connected with the mirror portion on the side of a second end portion and capable of supporting the mirror portion in an inclined state when the driving portion is driven. According to this structure, the state where the mirror portion is inclined can be easily maintained by the mirror support portion.

Preferably in the aforementioned vibrating mirror element according to the first aspect, the driving portion includes a first driving portion, that is cantilevered, having a fixed end on a side opposite to the first connecting portion and a second driving portion having a second connecting portion on the side opposite to the first connecting portion, the support portion includes a coupling support portion connected with the first connecting portion of the first driving portion or the first connecting portion of the second driving portion on the side of a first end portion and connected with the second connecting portion of the second driving portion on the side of a second end portion, and the thickness of the coupling support portion is larger than the thickness of the first driving portion and the thickness of the second driving portion. According to this structure, in the vibrating mirror element constituted by the first driving portion that is cantilevered, the second driving portion, and the coupling support portion connected with the first driving portion and the second driving portion, the rigidity of the coupling support portion can be increased due to the thickness of the coupling support portion larger than the thickness of the first driving portion and the thickness of the second driving portion, and hence the coupling support portion can be inhibited from flexural deformation.

Preferably in this case, the width of the coupling support portion in a second direction orthogonal to the first direction is not more than the width of the first driving portion in the second direction and not more than the width of the second driving portion in the second direction. According to this structure, the overall size of the vibrating mirror element in the second direction can be reduced while the thickness of the coupling support portion connected with the first driving portion and the second driving portion is rendered larger than the thickness of the first driving portion and the thickness of the second driving portion to ensure the rigidity of the coupling support portion, as compared with a case where the vibrating mirror element is so configured that the width of the coupling support portion is larger than the width of the first driving portion and the width of the second driving portion.

Preferably in the aforementioned vibrating mirror element in which the thickness of the coupling support portion is larger than the thickness of the first driving portion and the thickness of the second driving portion, the support portion further includes a mirror support portion connected with the mirror portion on the side of a second end portion and capable of supporting the mirror portion in an inclined state when the driving portion is driven, the mirror support portion is configured to be connected with the first connecting portion of the second driving portion on the side of a first end portion, and the thickness of the mirror support portion is larger than the thickness of the first driving portion and the thickness of the second driving portion. According to this structure, in the vibrating mirror element including the mirror support portion connected with the mirror portion and the second driving portion, the rigidity of the mirror support portion can be increased due to the thickness of the mirror support portion larger than the thickness of the first driving portion and the thickness of the second driving portion, and hence the mirror support portion can be inhibited from flexural deformation.

Preferably in the aforementioned vibrating mirror element in which the mirror support portion is connected with the first connecting portion of the second driving portion on the side of the first end portion, a plurality of the second driving portions and a plurality of the coupling support portions are provided while the number of the second driving portions and the number of the coupling support portions are equal to each other, and the second driving portions and the coupling support portions are connected to each other by alternately successively bending adjacent portions on either a first side of the first direction or a second side thereof in a state where the second driving portions and the coupling support portions are alternately arranged from the side of the mirror support portion toward the side of the first driving portion along the second direction, so that portions from the mirror support portion to the first driving portion are continuously connected. According to this structure, the second driving portion can be driven on the basis of the displacement of the connecting portion of the first driving portion and the coupling support portion while the second driving portion on the side of the mirror support portion can be driven on the basis of the displacement of the connecting portion of the second driving portion on the side of the first driving portion and the coupling support portion, and hence the inclination angle of the mirror support portion can be further increased. Thus, the inclination angle of the mirror portion can be further increased.

Preferably in the aforementioned vibrating mirror element according to the first aspect, the driving portion, the support portion, and the mirror portion are integrally formed. According to this structure, from the state where the driving portion, the support portion, and the mirror portion are integrally formed, a portion formed with the driving portion is removed by a prescribed height (thickness), whereby the vibrating mirror element in which the thickness of the support portion is larger than the thickness of the driving portion can be easily formed. Furthermore, no connection between each portion may be made separately in the driving portion, the support portion, and the mirror portion, and hence the number of steps of manufacturing the vibrating mirror element can be reduced.

Preferably in the aforementioned vibrating mirror element according to the first aspect, the mirror portion is configured to rotate about a first rotation center, and the mirror portion includes a mirror and a mirror portion-side driving portion rotating the mirror about a second rotation center orthogonal to the first rotation center in the in-plane direction of the mirror. According to this structure, the vibrating mirror element having the mirror that can accurately reflect light and capable of two-dimensionally optically scanning an object can be obtained.

Preferably in this case, the driving portion is configured to rotate the mirror portion about the first rotation center on the basis of a first frequency, and the mirror portion-side driving portion is configured to rotate the mirror about the second rotation center on the basis of a second frequency larger than the first frequency. According to this structure, the vibrating mirror element can two-dimensionally optically scan the object while the mirror portion rotates faster about the second rotation center than about the first rotation center.

Preferably in the aforementioned vibrating mirror element according to the first aspect, the thickness of the support portion is substantially constant along the first direction. According to this structure, the rigidity of the support portion can be kept substantially uniform along the first direction, and hence the support portion can be easily inhibited from flexural deformation.

Preferably in the aforementioned vibrating mirror element according to the first aspect, a pair of the driving portions are provided to hold the mirror portion therebetween, a pair of the support portions are provided to hold the mirror portion therebetween, and the pair of driving portions are configured to be substantially point-symmetrical to each other with respect to the center of the mirror portion, and the pair of support portions are configured to be substantially point-symmetrical to each other with respect to the center of the mirror portion. According to this structure, the mirror portion can be supported by the pair of driving portions that are substantially point-symmetrical to each other and the pair of support portions that are substantially point-symmetrical to each other. Thus, the own weight of the mirror portion can be evenly distributed, and hence the mirror portion can be more reliably inclined.

A method for manufacturing a vibrating mirror element according to a second aspect of the present invention includes steps of forming a vibrating mirror element portion including a mirror portion, a deformable driving portion having a first connecting portion and linearly extending along a first direction, and a support portion connected with the first connecting portion of the driving portion on the side of a first end portion and linearly extending along the first direction on the same substrate and rendering the thickness of the support portion larger than the thickness of the driving portion by removing at least part of a portion of the substrate corresponding to the driving portion.

As hereinabove described, the method for manufacturing a vibrating mirror element according to the second aspect of the present invention includes the step of rendering the thickness of the support portion larger than the thickness of the driving portion. Thus, the rigidity of the support portion can be increased due to the thickness of the support portion larger than the thickness of the driving portion, and hence the vibrating mirror element in which the support portion is inhibited from flexural deformation even if the own weight of the driving portion or the like connected to the support portion is applied to the support portion can be obtained.

Preferably in the aforementioned method for manufacturing a vibrating mirror element according to the second aspect, the substrate includes a semiconductor substrate, and the step of rendering the thickness of the support portion larger than the thickness of the driving portion includes a step of removing the semiconductor substrate of the portion corresponding to the driving portion by etching. According to this structure, the semiconductor substrate of the portion corresponding to the driving portion is removed by etching, whereby the thickness of the support portion can be easily rendered larger than the thickness of the driving portion.

Preferably in this case, the step of forming the vibrating mirror element portion on the same substrate includes a step of forming the vibrating mirror element portion on an etching stopper layer provided on the semiconductor substrate, and the step of removing the portion corresponding to the driving portion by etching has a step of removing the semiconductor substrate of the portion corresponding to the driving portion from a side opposite to a side formed with the vibrating mirror element portion until the etching stopper layer by etching. According to this structure, the etching stopper layer can inhibit the vibrating mirror element portion from being etched in addition to the semiconductor substrate.

Preferably in the aforementioned method for manufacturing a vibrating mirror element in which the semiconductor substrate is removed until the etching stopper layer, the step of removing the portion corresponding to the driving portion by etching further has a step of removing by etching the etching stopper layer of the portion corresponding to the driving portion from which the semiconductor substrate has been removed. According to this structure, the thickness of the driving portion can be reduced by the thickness of the removed etching stopper layer, and hence the driving portion can be more largely deformed.

Preferably in the aforementioned method for manufacturing a vibrating mirror element according to the second aspect, the step of forming the vibrating mirror element portion on the same substrate includes a step of forming the driving portion including a first driving portion, that is cantilevered, having a fixed end on a side opposite to the first connecting portion and a second driving portion having a second connecting portion on the side opposite to the first connecting portion and a step of forming the support portion including a coupling support portion connected with the first connecting portion of the first driving portion or the first connecting portion of the second driving portion on the side of a first end portion and connected with the second connecting portion of the second driving portion on the side of a second end portion, and the step of rendering the thickness of the support portion larger than the thickness of the driving portion includes a step of rendering the thickness of the coupling support portion larger than the thickness of the first driving portion and the thickness of the second driving portion by removing at least part of portions of the substrate corresponding to the first driving portion and the second driving portion. According to this structure, in the vibrating mirror element constituted by the first driving portion that is cantilevered, the second driving portion, and the coupling support portion connected with the first driving portion and the second driving portion, the rigidity of the coupling support portion can be increased due to the thickness of the coupling support portion larger than the thickness of the first driving portion and the thickness of the second driving portion, and hence the coupling support portion can be inhibited from flexural deformation.

MODES FOR CARRYING OUT THE INVENTION

An Embodiment embodying the present invention is now described on the basis of the drawings.

First, the structure of a vibrating mirror element 100 according to the embodiment of the present invention is described with reference to FIGS. 1 to 10.

Figures 1, 2:
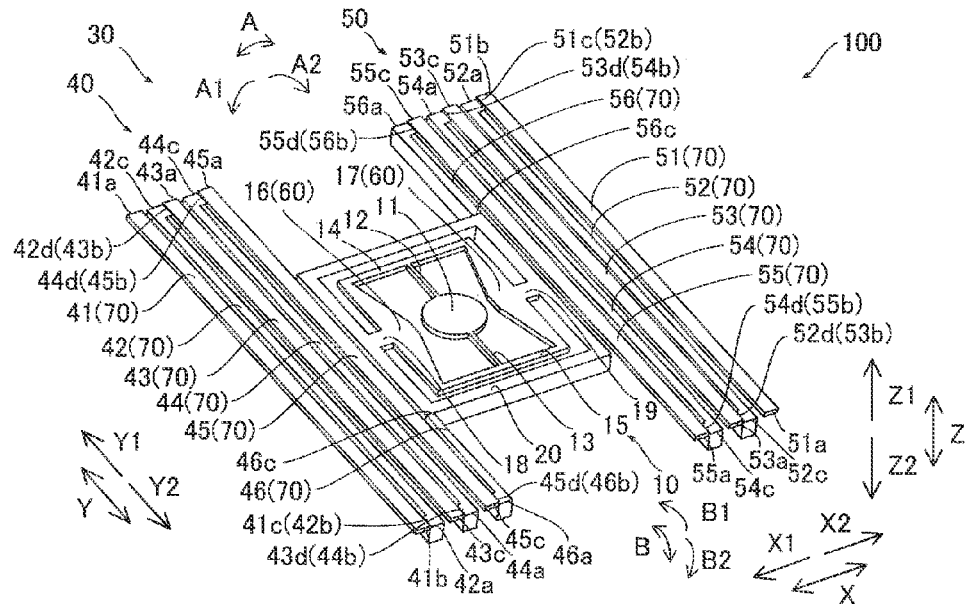
FIG. 1 A perspective view showing the structure of a vibrating mirror element according to an embodiment of the present invention.
FIG. 2 A plan view showing the structure of the vibrating mirror element according to the embodiment of the present invention.
Figure 3:
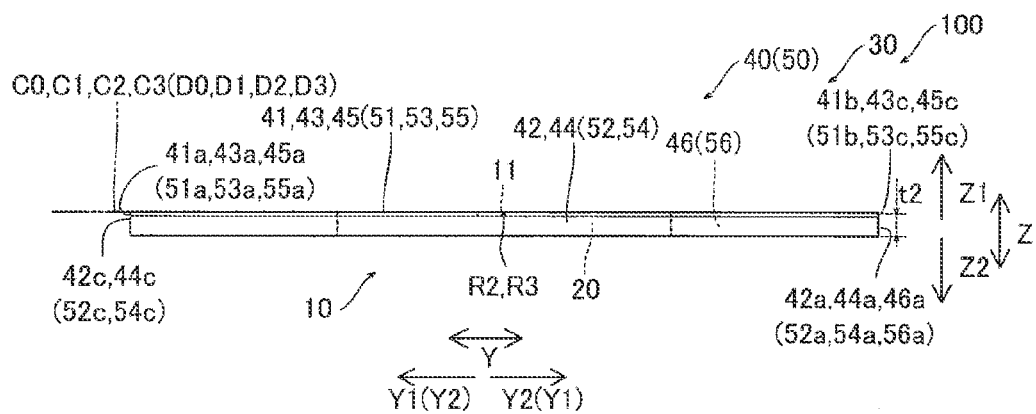
FIG. 3 A side elevational view of the vibrating mirror element shown in FIG. 2 as viewed in a direction E (direction F).

The vibrating mirror element 100 according to the embodiment of the present invention includes an X-directional optical scanning portion 10 to optically scan an object in a direction X with a mirror 11 described later and a Y-directional optical scanning portion 30 to optically scan an object in a direction Y orthogonal to the direction X with the mirror 11, as shown in FIGS. 1 to 3. The X-directional optical scanning portion 10 and the Y-directional optical scanning portion 30 are integrally formed on a common upper Si substrate 1 having a thickness t1 of about 0.1 mm, as shown in FIGS. 4 to 8. The X-directional optical scanning portion 10 is an example of the "mirror portion" in the present invention.

The vibrating mirror element 100 is built into a device optically scanning an object, such as an unshown projector, and configured to optically scan an object in the direction X with the X-directional optical scanning portion 10 and optically scan the object in the direction Y with the Y-directional optical scanning portion 30. The X-directional optical scanning portion 10 is configured to resonantly drive the mirror 11 at a resonance frequency of about 30 kHz, while the Y-directional optical scanning portion 30 is configured to nonresonantly drive the mirror 11 at a frequency of about 60 Hz. The Y-directional optical scanning portion 30 is so configured to nonresonantly drive the mirror 11 that there is no change in resonance frequency resulting from temperature change around the vibrating mirror element 100, whereby the same can stably drive the mirror 11 described later. The resonance frequency of about 30 kHz is an example of the "second frequency" in the present invention, and the frequency of about 60 Hz is an example of the "first frequency" in the present invention.

The X-directional optical scanning portion 10 includes the mirror 11, torsionally deformable torsion bars 12 and 13 connected with the mirror 11, an inclinable bar 14 connected with the torsion bar 12, an inclinable bar 15 connected with the torsion bar 13, inner driving portions 16 and 17 connected with the bars 14 and 15, fixing portions 18 and 19 fixing the inner driving portions 16 and 17 respectively, and a frame body 20, as shown in FIGS. 1 and 2. The frame body 20 (X-directional optical scanning portion 10) has a length L1 of about 5 mm in the direction Y and a length L2 of about 4 mm in the direction X, as shown in FIG. 2. The inner driving portions 16 and 17 are examples of the "mirror portion-side driving portion" in the present invention.

Figure 4:
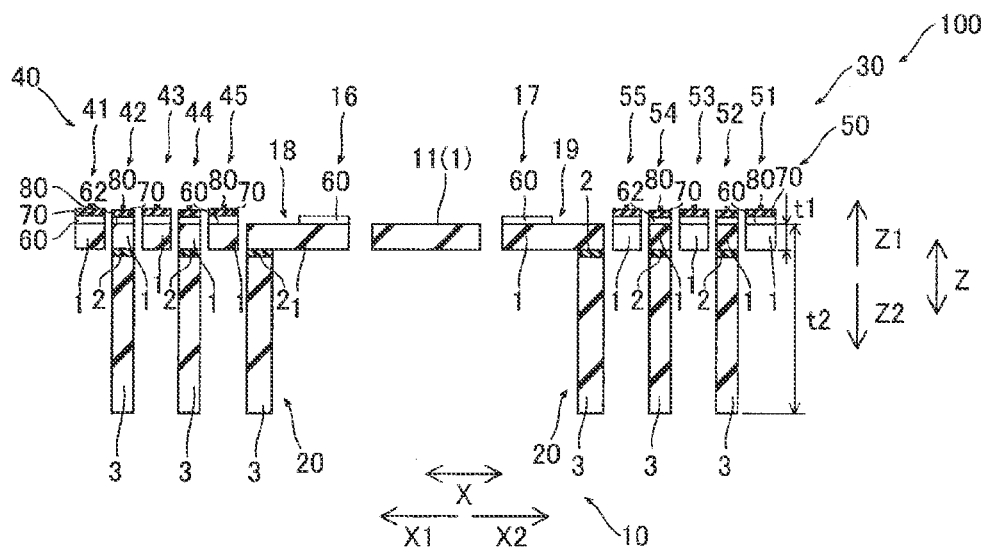
FIG. 4 An enlarged sectional view of the vibrating mirror element taken along the line 1000-1000 shown in FIG. 2.
Figure 8:
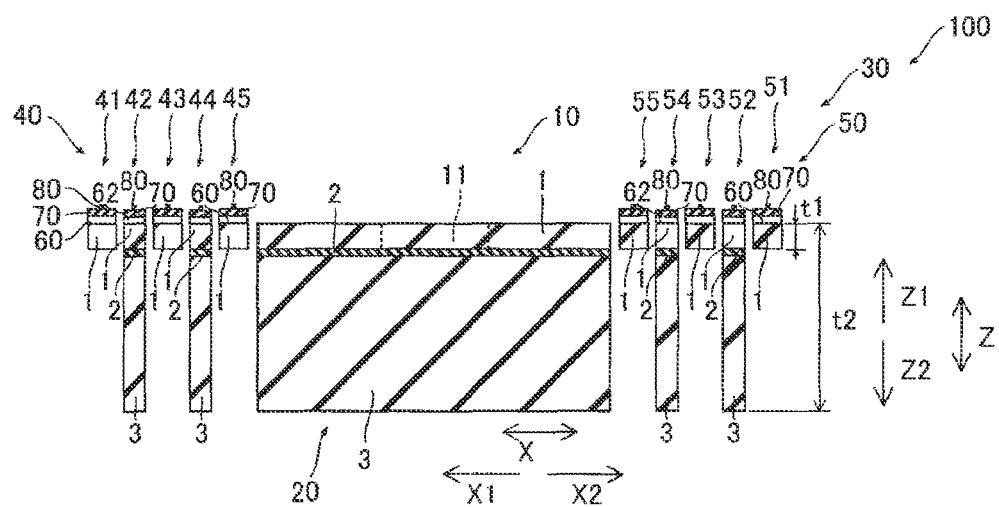
FIG. 8 An enlarged sectional view of the vibrating mirror element taken along the line 5000-5000 shown in FIG. 2.

As shown in FIGS. 4 and 8, while the X-directional optical scanning portion 10 excluding the frame body 20 has a thickness t1 of about 0.1 mm in a direction Z, the frame body 20 has a thickness t2 of about 0.5 mm larger than t1. While the X-directional optical scanning portion 10 excluding the frame body 20 includes the upper Si substrate 1 having the thickness t1 of about 0.1 mm, the frame body 20 is constituted by the upper Si substrate 1 having the thickness t1 of about 0.1 mm, a thin $SiO_2$ layer 2 formed on the lower surface (on a Z2 side) of the upper Si substrate 1, and a lower Si Substrate 3 having a thickness of about 0.4 mm formed on the lower surface of the $SiO_2$ layer 2.

As shown in FIG. 2, the mirror 11 and the torsion bars 12 and 13 are configured to incline beyond inclinations of the bars 14 and 15 by resonance. The vibrating mirror element 100 is so configured that both of rotation centers R1 and R2 for optically scanning the object in the directions X and Y respectively pass through the center R3 of the mirror 11. This center R3 of the mirror 11 is located in the center of the X-directional optical scanning portion 10 in the directions X and Y. The rotation center R1 is an example of the "second rotation center" in the present invention, and the rotation center R2 is an example of the "first rotation center" in the present invention. The direction Y is an example of the "first direction" in the present invention, and the direction X is an example of the "second direction" in the present invention.

As shown in FIG. 1, the inner driving portions 16 and 17 are configured to be flexurally deformed in a concave shape and a convex shape in the direction Z with respect to the fixed portions 18 and 19 serving as fixed ends, respectively. The X-directional optical scanning portion 10 is configured to be capable of inclining the mirror 11 along arrow A1 or A2 about the rotation center R1 (see FIG. 2) by deforming the inner driving portions 16 and 17 in the directions opposite to each other. The X-directional optical scanning portion 10 is configured to vibrate the mirror 11 in a direction A about the rotation center R1 and to optically scan the object by repeating the deforming operation. The inner driving portions 16 and 17 each have a structure in which a piezoelectric actuator 60 is formed on the upper surface (surface on a Z1 side) of the upper Si substrate 1, as shown in FIG. 4. The structure of the piezoelectric actuator 60 is described later.

The Y-directional optical scanning portion 30 includes a driving unit 40 formed on the X1 side of the X-directional optical scanning portion 10 and a driving unit 50 formed on the X2 side of the X-directional optical scanning portion 10, as shown in FIG. 2. In other words, the driving units 40 and 50 are arranged to hold the X-directional optical scanning portion 10 therebetween in the direction X.

In the driving unit 40, a driving portion 41, a coupling support portion 42, a driving portion 43, a coupling support portion 44, a driving portion 45, and a mirror support portion 46 are arranged in this order from an X1 side toward an X2 side along the direction X. In the driving unit 50, a driving portion 51, a coupling support portion 52, a driving portion 53, a coupling support portion 54, a driving portion 55, and a mirror support portion 56 are arranged in this order from the X2 side toward the X1 side along the direction X. The driving portion 41, the coupling support portion 42, the driving portion 43, the coupling support portion 44, the driving portion 45, and the mirror support portion 46 are formed to linearly extend in the direction Y, and the driving portion 51, the coupling support portion 52, the driving portion 53, the coupling support portion 54, the driving portion 55, and the mirror support portion 56 are formed to linearly extend in the direction Y. The driving portions 41 and 51 are examples of the "first driving portion" in the present invention, and the driving portions 43, 45, 53, and 55 are examples of the "second driving portion" in the present invention. The coupling support portions 42, 44, 52, and 54 and the mirror support portions 46 and 56 are examples of the "support portion" in the present invention.

Figure 6:
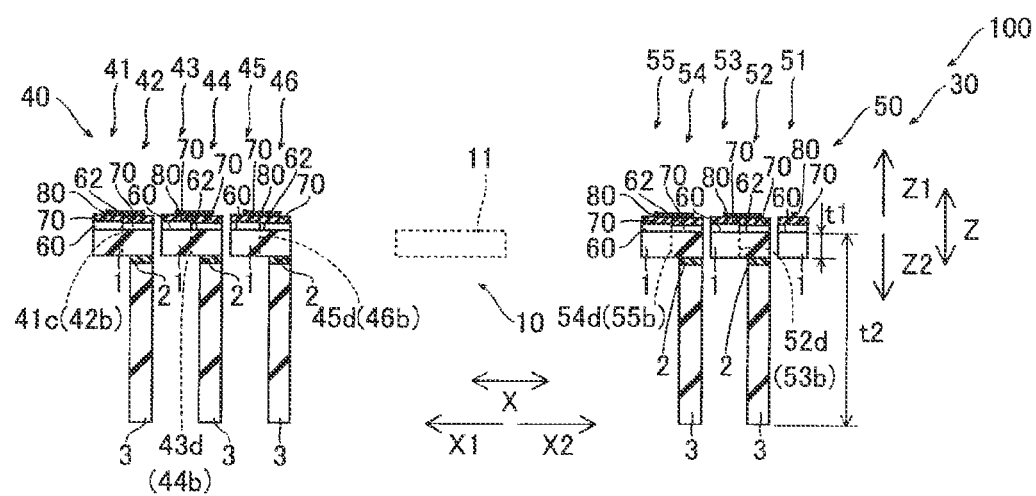
FIG. 6 An enlarged sectional view of the vibrating mirror element taken along the line 3000-3000 shown in FIG. 2.
Figure 7:
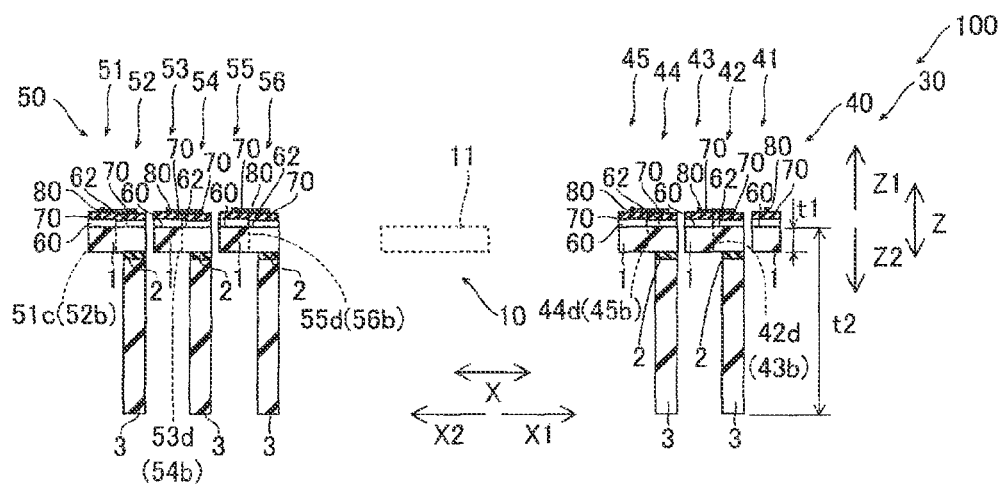
FIG. 7 An enlarged sectional view of the vibrating mirror element taken along the line 4000-4000 shown in FIG. 2.

In this embodiment, as shown in FIGS. 4, 6, and 7, the driving portions 41, 43, 45, 51, 53, and 55 each have a thickness t1 of about 0.1 mm in the direction Z, while the coupling support portions 42, 44, 52, and 54 and the mirror support portions 46 (see FIG. 6) and 56 (see FIG. 7) each have a thickness t2 of about 0.5 mm. In other words, the thickness t2 of each of the coupling support portions 42, 44, 52, and 54 in the direction Z and the thickness t2 of each of the mirror support portions 46 and 56 in the direction Z are substantially equal to each other, and the thicknesses t1 of the driving portions 41, 43, 45, 51, 53, and 55 in the direction Z are substantially equal to each other. Furthermore, the thickness t2 (about 0.5 mm) of each of the coupling support portions 42, 44, 52, and 54 and the mirror support portions 46 and 56 in the direction Z is larger than the thickness t1 (about 0.1 mm) of each of the driving portions 41, 43, 45, 51, 53, and 55 in the direction Z.

As shown in FIG. 8, the driving portions 41, 43, 45, 51, 53, and 55 each are configured to have the thickness t1 in the direction Z substantially equal to that of the X-directional optical scanning portion 10 excluding the frame body 20. In other words, the driving portions 41, 43, 45, 51, 53, and 55 include the upper Si substrate 1 having the thickness t1 of about 0.1 mm. The portions of the upper Si substrate 1 in positions corresponding to the driving portions 41, 43, 45, 51, 53, and 55 are examples of the "third portion" in the present invention.

On the other hand, the coupling support portions 42, 44, 52, and 54 and the mirror support portions 46 (see FIG. 6) and 56 (see FIG. 7) each are configured to have the thickness t2 in the direction Z substantially equal to that of the frame body 20. In other words, the coupling support portions 42, 44, 52, and 54 and the mirror support portions 46 and 56 each include the upper Si substrate 1 having the thickness t1 of about 0.1 mm, a thin $SiO_2$ layer 2 formed on the lower surface (on the Z2 side) of the upper Si substrate 1, and a lower Si substrate 3 having a thickness (t2−t1) of about 0.4 mm formed on the lower surface of the $SiO_2$ layer 2. The portions of the upper Si substrate 1 in positions corresponding to the coupling support portions 42, 44, 52, and 54 and the mirror support portions 46 and 56 are examples of the "second portion" in the present invention, and the lower Si substrate 3 is an example of the "substrate" in the present invention. An example of the "first portion" in the present invention is constituted by the SiO$_2$ layer 2 and the lower Si substrate 3. The thickness t1 is an example of the "second thickness" in the present invention, and the thickness (t2−t1) is an example of the "first thickness" in the present invention.

As shown in FIGS. 3 and 4, the driving portions 41, 43, 45, 51, 53, and 55 each are configured to have the thickness t1 (see FIG. 4) in the direction Z that is substantially uniform entirely in the direction X (see FIG. 4) and the direction Y (see FIG. 3) while the coupling support portions 42, 44, 52, and 54 and the mirror support portions 46 and 56 each are configured to have the thickness t2 in the direction Z that is substantially uniform entirely in the direction X (see FIGS. 4, 6, and 7) and the direction Y (see FIG. 3).

In this embodiment, as shown in FIG. 2, the driving portions 41, 43, 45, 51, 53, and 55 each have a length L3 of about 12 mm in the direction Y and a width W1 of about 0.4 mm in the direction X. The coupling support portions 42, 44, 52, and 54 each have a length L3 of about 12 mm in the direction Y and a width W2 of about 0.3 mm in the direction X. The mirror support portions 46 and 56 each have a length L4 of about 3.5 mm in the direction Y and a width W2 of about 0.3 mm in the direction X. In other words, the width W2 of each of the coupling support portions 42, 44, 52, and 54 in the direction X and the width W2 of each of the mirror support portions 46 and 56 in the direction X are substantially equal to each other, and the widths W1 of the driving portions 41, 43, 45, 51, 53, and 55 in the direction X are substantially equal to each other. Furthermore, the width W2 (about 0.3 mm) of each of the coupling support portions 42, 44, 52, and 54 and the mirror support portions 46 and 56 in the direction X is smaller than the width W1 (about 0.4 mm) of each of the driving portions 41, 43, 45, 51, 53, and 55 in the direction X.

The rotation center R2 passing through the center R3 of the mirror 11 passes through the substantially central portions of the driving portions 41, 43, 45, 51, 53, and 55 and the coupling support portions 42, 44, 52, and 54 in the direction Y when the driving portions 41, 43, 45, 51, 53, and 55 are not driven. The driving units 40 and 50 are configured to be substantially point-symmetrical to each other with respect to the center R3 of the mirror 11.

Specifically, as shown in FIG. 2, an end portion 41a of the driving portion 41 of the driving unit 40 on a Y1 side is fixed by an unshown outer frame body. In other words, the driving portion 41 has a cantilever structure having the end portion 41a on the Y1 side serving as a fixed end and an end portion 41b on a Y2 side serving as a free end. Thus, the driving portion 41 is flexurally deformed to bow when the same is driven, whereby the end portion 41b is displaced in the direction Z (see FIG. 1) so that the driving portion 41 is inclined. At this time, the end portion 41a that is a fixed end is not displaced even when the driving portion 41 is driven. Thus, a tangent line C1 (see FIG. 3) at the end portion 41b that is a free end is inclined at a first inclination angle with respect to a tangent line C0 (see FIG. 3) at the end portion 41a that is a fixed end. In this embodiment, the tangent line C0 is located on a horizontal plane.

A connecting portion 41c is provided in the vicinity of the end portion 41b of the driving portion 41 on the Y2 side. On the connecting portion 41c, the driving portion 41 is connected with a connecting portion 42b in the vicinity of an end portion 42a of the coupling support portion 42 on the Y2 side. The coupling support portion 42 is configured to be substantially unbowed even if the end portion 41b of the driving portion 41 is displaced in the direction Z (see FIG. 1) when the driving portion 41 is driven. Thus, the coupling support portion 42 is located on the tangent line C1 at the end portion 41b of the driving portion 41 that is a free end when the driving portion 41 is driven, whereby the coupling support portion 42 is inclined at the first inclination angle with respect to the tangent line C0 at the end portion 41a of the driving portion 41 that is a fixed end. In other words, the coupling support portion 42 is configured to maintain the inclination at the end portion 41b (connecting portion 41c) of the driving portion 41. The connecting portion 41c is an example of the "first connecting portion" in the present invention, and the end portion 42a is an example of the "first end portion" in the present invention.

A connecting portion 42d is provided in the vicinity of an end portion 42c of the coupling support portion 42 on the Y1 side. On the connecting portion 42d, the coupling support portion 42 is connected with a connecting portion 43b in the vicinity of an end portion 43a of the driving portion 43 on the Y1 side. The coupling support portion 42 is substantially unbowed so that the connecting portion 42d is located on the tangent line C1 (see FIG. 3). Thus, the connecting portion 43b (end portion 43a) of the driving portion 43 connected to the coupling support portion 42 on the connecting portion 42d is located on the tangent line C1, and inclined at the first inclination angle with respect to the tangent line C0 (see FIG. 3). The end portion 42c is an example of the "second end portion" in the present invention, and the connecting portion 43b is an example of the "second connecting portion" in the present invention.

The driving portion 43 connected to the coupling support portion 42 on the connecting portion 42d is configured to be deformed using the connecting portion 43b (end portion 43a) on the Y1 side as a reference. Thus, the driving portion 43 is flexurally deformed to bow when the same is driven, whereby an end portion 43c is displaced in the direction Z (see FIG. 1) so that the driving portion 43 is inclined with respect to the coupling support portion 42. Thus, a tangent line C2 (see FIG. 3) at the end portion 43c is inclined at a second inclination angle with respect to the tangent line C1 (see FIG. 3) at the end portion 43a serving as a reference.

As shown in FIG. 2, a connecting portion 43d is provided in the vicinity of the end portion 43c of the driving portion 43 on the Y2 side. On the connecting portion 43d, the driving portion 43 is connected with a connecting portion 44b in the vicinity of an end portion 44a of the coupling support portion 44 on the Y2 side. The coupling support portion 44 is configured to be substantially unbowed even if the end portion 43c of the driving portion 43 is displaced in the direction Z (see FIG. 1) when the driving portion 43 is driven. Thus, the coupling support portion 44 is located on the tangent line C2 at the end portion 43c of the driving portion 43 when the driving portion 43 is driven, whereby the coupling support portion 44 is inclined at the second inclination angle with respect to the tangent line C1 at the end portion 43a serving as a reference. In other words, the coupling support portion 44 is configured to maintain the inclination at the end portion 43c (connecting portion 43d) of the driving portion 43. The connecting portion 43d is an example of the "first connecting portion" in the present invention, and the end portion 44a is an example of the "first end portion" in the present invention.

A connecting portion 44d is provided in the vicinity of an end portion 44c of the coupling support portion 44 on the Y1 side. On the connecting portion 44d, the coupling support portion 44 is connected with a connecting portion 45b in the vicinity of an end portion 45a of the driving portion 45 on the Y1 side. The coupling support portion 44 is substantially unbowed so that the connecting portion 44d is located on the tangent line C2 (see FIG. 3). Thus, the connecting portion 45*b* (end portion 45*a*) of the driving portion 45 connected to the coupling support portion 44 on the connecting portion 44*d* is located on the tangent line C2, and inclined at the second inclination angle with respect to the tangent line C1 (see FIG. 3). The end portion 44*c* is an example of the "second end portion" in the present invention, and the connecting portion 45*b* is an example of the "second connecting portion" in the present invention.

The driving portion 45 connected to the coupling support portion 44 on the connecting portion 44*d* is configured to be deformed using the connecting portion 45*b* (end portion 45*a*) on the Y1 side as a reference. Thus, the driving portion 45 is flexurally deformed to bow when the same is driven, whereby an end portion 45*c* is displaced in the direction Z (see FIG. 1) so that the driving portion 45 is inclined with respect to the coupling support portion 44. Thus, a tangent line C3 (see FIG. 3) at the end portion 45*c* is inclined at a third inclination angle with respect to the tangent line C2 (see FIG. 3) at the end portion 45*a* serving as a reference.

As shown in FIG. 2, a connecting portion 45*d* is provided in the vicinity of the end portion 45*c* of the driving portion 45 on the Y2 side. On the connecting portion 45*d*, the driving portion 45 is connected with a connecting portion 46*b* in the vicinity of an end portion 46*a* of the mirror support portion 46 on the Y2 side. The mirror support portion 46 is configured to be substantially unbowed even if the end portion 45*c* of the driving portion 45 is displaced in the direction Z (see FIG. 1) when the driving portion 45 is driven. Thus, the mirror support portion 46 is located on the tangent line C3 at the end portion 45*c* of the driving portion 45 when the driving portion 45 is driven, whereby the mirror support portion 46 is inclined at the third inclination angle with respect to the tangent line C2 at the end portion 45*a* serving as a reference. In other words, the mirror support portion 46 is configured to maintain the inclination at the end portion 45*c* (connecting portion 45*d*) of the driving portion 45. Consequently, the mirror support portion 46 is configured to be inclined along arrow B1 or B2 (see FIG. 1) at a fourth inclination angle obtained by substantially adding the first inclination angle, the second inclination angle, and the third inclination angle with respect to the tangent line C0 (located on the horizontal plane: see FIG. 3). The connecting portion 45*d* is an example of the "first connecting portion" in the present invention, and the end portion 46*a* is an example of the "first end portion" in the present invention.

On an end portion 46*c* on the Y1 side, the mirror support portion 46 is connected with the X-directional optical scanning portion 10 in the vicinity of an end portion on the X1 side of the side surface on the Y2 side of the frame body 20 of the X-directional optical scanning portion 10. Thus, in the driving unit 40, adjacent portions are alternately successively bent in the vicinity of the end portions on the Y1 side or the end portions on the Y2 side from the mirror support portion 46 on the X2 side toward the driving portion 41 on the X1 side to be connected to each other, so that portions from the mirror support portion 46 to the driving portion 41 are continuously connected. The end portion 46*c* is an example of the "second end portion" in the present invention.

As shown in FIG. 2, an end portion 51*a* of the driving portion 51 of the driving unit 50 on the Y2 side is fixed by the unshown outer frame body. In other words, the driving portion 51 has a cantilever structure having the end portion 51*a* on the Y2 side serving as a fixed end and an end portion 51*b* on the Y1 side serving as a free end. Thus, the driving portion 51 is flexurally deformed to bow when the same is driven, whereby an end portion 51*b* is displaced in the direction Z (see FIG. 1) so that the driving portion 51 is inclined. At this time, the end portion 51*a* that is a fixed end is not displaced even when the driving portion 51 is driven. Thus, a tangent line D1 (see FIG. 3) at the end portion 51*b* that is a free end is inclined at a fifth inclination angle with respect to a tangent line D0 (see FIG. 3) at the end portion 51*a* that is a fixed end. In this embodiment, the tangent line D0 is located on the horizontal plane.

A connecting portion 51*c* is provided in the vicinity of the end portion 51*b* of the driving portion 51 on the Y1 side. On the connecting portion 51*c*, the driving portion 51 is connected with a connecting portion 52*b* in the vicinity of an end portion 52*a* of the coupling support portion 52 on the Y1 side. The coupling support portion 52 is configured to be substantially unbowed even if the end portion 51*b* of the driving portion 51 is displaced in the direction Z (see FIG. 1) when the driving portion 51 is driven. Thus, the coupling support portion 52 is located on the tangent line D1 at the end portion 51*b* of the driving portion 51 that is a free end when the driving portion 51 is driven, whereby the coupling support portion 52 is inclined at the fifth inclination angle with respect to the tangent line D0 at the end portion 51*a* of the driving portion 51 that is a fixed end. In other words, the coupling support portion 52 is configured to maintain the inclination at the end portion 51*b* (connecting portion 51*c*) of the driving portion 51. The connecting portion 51*c* is an example of the "first connecting portion" in the present invention, and the end portion 52*a* is an example of the "first end portion" in the present invention.

A connecting portion 52*d* is provided in the vicinity of an end portion 52*c* of the coupling support portion 52 on the Y2 side. On the connecting portion 52*d*, the coupling support portion 52 is connected with a connecting portion 53*b* in the vicinity of an end portion 53*a* of the driving portion 53 on the Y2 side. The coupling support portion 52 is substantially unbowed so that the connecting portion 52*d* is located on the tangent line D1 (see FIG. 3). Thus, the connecting portion 53*b* (end portion 53*a*) of the driving portion 53 connected to the coupling support portion 52 on the connecting portion 52*d* is located on the tangent line D1, and inclined at the fifth inclination angle with respect to the tangent line D0 (see FIG. 3). The end portion 52*c* is an example of the "second end portion" in the present invention, and the connecting portion 53*b* is an example of the "second connecting portion" in the present invention.

The driving portion 53 connected to the coupling support portion 52 on the connecting portion 52*d* is configured to be deformed using the connecting portion 53*b* (end portion 53*a*) on the Y2 side as a reference. Thus, the driving portion 53 is flexurally deformed to bow when the same is driven, whereby an end portion 53*c* is displaced in the direction Z (see FIG. 1) so that the driving portion 53 is inclined with respect to the coupling support portion 52. Thus, a tangent line D2 (see FIG. 3) at the end portion 53*c* is inclined at a sixth inclination angle with respect to the tangent line D1 (see FIG. 3) at the end portion 53*a* serving as a reference.

As shown in FIG. 2, a connecting portion 53*d* is provided in the vicinity of the end portion 53*c* of the driving portion 53 on the Y1 side. On the connecting portion 53*d*, the driving portion 53 is connected with a connecting portion 54*b* in the vicinity of an end portion 54*a* of the coupling support portion 54 on the Y1 side. The coupling support portion 54 is configured to be substantially unbowed even if the end portion 53*c* of the driving portion 53 is displaced in the direction Z (see FIG. 1) when the driving portion 53 is driven. Thus, the coupling support portion 54 is located on the tangent line D2 at the end portion 53*c* of the driving portion 53 when the driving portion 53 is driven, whereby the coupling support portion 54 is inclined at the sixth inclination angle with respect to the tangent line D1 at the end portion 53a serving as a reference. In other words, the coupling support portion 54 is configured to maintain the inclination at the end portion 53c (connecting portion 53d) of the driving portion 53. The connecting portion 53d is an example of the "first connecting portion" in the present invention, and the end portion 54a is an example of the "first end portion" in the present invention.

A connecting portion 54d is provided in the vicinity of an end portion 54c of the coupling support portion 54 on the Y2 side. On the connecting portion 54d, the coupling support portion 54 is connected with a connecting portion 55b in the vicinity of an end portion 55a of the driving portion 55 on the Y2 side. The coupling support portion 54 is substantially unbowed so that the connecting portion 54d is located on the tangent line D2 (see FIG. 3). Thus, the connecting portion 55b (end portion 55a) of the driving portion 55 connected to the coupling support portion 54 on the connecting portion 54d is located on the tangent line D2, and inclined at the sixth inclination angle with respect to the tangent line D1 (see FIG. 3). The end portion 54c is an example of the "second end portion" in the present invention, and the connecting portion 55b is an example of the "second connecting portion" in the present invention.

The driving portion 55 connected to the coupling support portion 54 on the connecting portion 54d is configured to be deformed using the connecting portion 55b (end portion 55a) on the Y2 side as a reference. Thus, the driving portion 55 is flexurally deformed to bow when the same is driven, whereby an end portion 55c is displaced in the direction Z (see FIG. 1) so that the driving portion 55 is inclined with respect to the coupling support portion 54. Thus, a tangent line D3 (see FIG. 3) at the end portion 55c is inclined at a seventh inclination angle with respect to the tangent line D2 (see FIG. 3) at the end portion 55a serving as a reference.

As shown in FIG. 2, a connecting portion 55d is provided in the vicinity of the end portion 55c of the driving portion 55 on the Y1 side. On the connecting portion 55d, the driving portion 55 is connected with a connecting portion 56b in the vicinity of an end portion 56a of the mirror support portion 56 on the Y1 side. The mirror support portion 56 is configured to be substantially unbowed even if the end portion 55c of the driving portion 55 is displaced in the direction Z (see FIG. 1) when the driving portion 55 is driven. Thus, the mirror support portion 56 is located on the tangent line D3 at the end portion 55c of the driving portion 55 when the driving portion 55 is driven, whereby the mirror support portion 56 is inclined at the seventh inclination angle with respect to the tangent line D2 at the end portion 55a serving as a reference. In other words, the mirror support portion 56 is configured to maintain the inclination at the end portion 55c (connecting portion 55d) of the driving portion 55. Consequently, the mirror support portion 56 is configured to be inclined along arrow B1 or B2 (see FIG. 1) at an eighth inclination angle obtained by substantially adding the fifth inclination angle, the sixth inclination angle, and the seventh inclination angle with respect to the tangent line D0 (located on the horizontal plane: see FIG. 3). The connecting portion 55d is an example of the "first connecting portion" in the present invention, and the end portion 56a is an example of the "first end portion" in the present invention.

On an end portion 56c on the Y2 side, the mirror support portion 56 is connected with the X-directional optical scanning portion 10 in the vicinity of an end portion on the X2 side of the side surface on the Y1 side of the frame body 20 of the X-directional optical scanning portion 10. Thus, in the driving unit 50, adjacent portions are alternately successively bent in the vicinity of the end portions on the Y1 side or the end portions on the Y2 side from the mirror support portion 56 on the X1 side toward the driving portion 51 on the X2 side to be connected to each other, so that portions from the mirror support portion 56 to the driving portion 51 are continuously connected. The end portion 56c is an example of the "second end portion" in the present invention.

When the driving portions 41, 43, 45, 51, 53, and 55 are not driven, the X-directional optical scanning portion 10 and the Y-directional optical scanning portion 30 (driving units 40 and 50) are arranged substantially parallel to a plane (horizontal plane) passing through the end portion (fixed end) 41a of the driving portion 41 on the Y1 side and the end portion (fixed end) 51a of the driving portion 51 on the Y2 side.

The driving portions 41, 43, 45, 51, 53, and 55 are configured to be deformed by voltage application for driving, and are so configured that a voltage applied to the driving portions 41, 43 and 45 and a voltage applied to the driving portions 51, 53, and 55 are opposite in phase to each other. When the driving portions 41, 43, 45, 51, 53, and 55 are driven while deformed by voltage application to each of the driving portions 41, 43, 45, 51, 53, and 55, the driving units 40 and 50 are substantially point-symmetrical to each other so that the degrees of the inclinations of the mirror support portions 46 and 56 are substantially equal to each other. Furthermore, the voltage applied to the driving portions 41, 43 and 45 and the voltage applied to the driving portions 51, 53, and 55 are opposite in phase to each other, whereby the fourth inclination angle with respect to the tangent line C0 (located on the horizontal plane) of the mirror support portion 46 and the eighth inclination angle with respect to the tangent line D0 (located on the horizontal plane) of the mirror support portion 56 are symmetrical to each other with respect to the horizontal plane. In other words, the eighth inclination angle with respect to the horizontal plane of the mirror support portion 56 and the fourth inclination angle with respect to the horizontal plane of the mirror support portion 46 are opposite in direction, and substantially the same in magnitude (scalar quantity).

The X-directional optical scanning portion 10 is connected with the mirror support portion 46 in the vicinity of the end portion on the X1 side of the side surface on the Y2 side of the frame body 20 of the X-directional optical scanning portion 10, and connected with the mirror support portion 56 in the vicinity of the end portion on the X2 side of the side surface on the Y1 side of the frame body 20, whereby the side surface on the Y1 side of the frame body 20 is located above (Z1 side) or below (Z2 side) the side surface on the Y2 side so that the X-directional optical scanning portion 10 is inclined in a direction B (see FIG. 1). Consequently, the X-directional optical scanning portion 10 is configured to be supported by the mirror support portions 46 and 56 in an inclined state when the same is located on a plane including the tangent lines C3 and D3. A specific driving operation of the Y-directional optical scanning portion 30 is described later.

Figure 5:
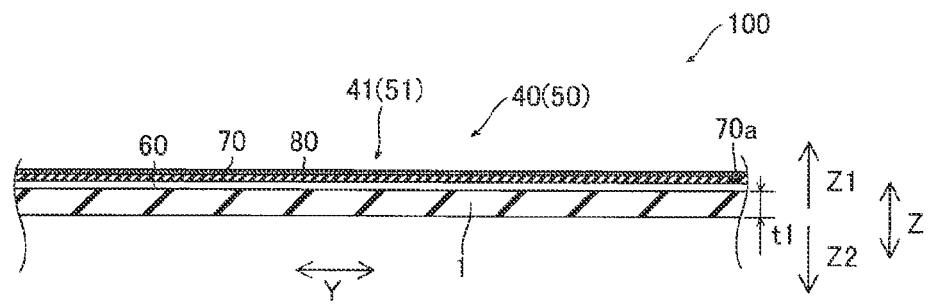
FIG. 5 An enlarged sectional view of the vibrating mirror element taken along the line 2000-2000 shown in FIG. 2.

As shown in FIGS. 4 to 8, the driving portions 41, 43, 45, 51, 53, and 55 each have a structure obtained by stacking a piezoelectric actuator 60, an insulating layer 70 made of polyimide, and a wiring portion 80 in this order on the upper surface (surface on the Z1 side) of the upper Si substrate 1. The wiring portion 80 is made of a conductive metallic material such as Al, Cr, Cu, Au, or Pt. The wiring portion 80 is formed on a substantially central portion of each of the driving portions 41, 43, 45, 51, 53, and 55 in the direction X, as shown in FIGS. 4 and 8, and formed to extend in the direction Y, as shown in FIG. 5. The total thickness of the piezoelectric actuator 60, the insulating layer 70, and the wiring portion 80 in each of the driving portions 41, 43, 45, 51, 53, and 55 is small as compared with the thickness t1 of the upper Si substrate 1, and hence the thickness of each of the driving portions 41, 43, 45, 51, 53, and 55 is substantially equal to the thickness t1 of the upper Si substrate 1.

Figure 9:
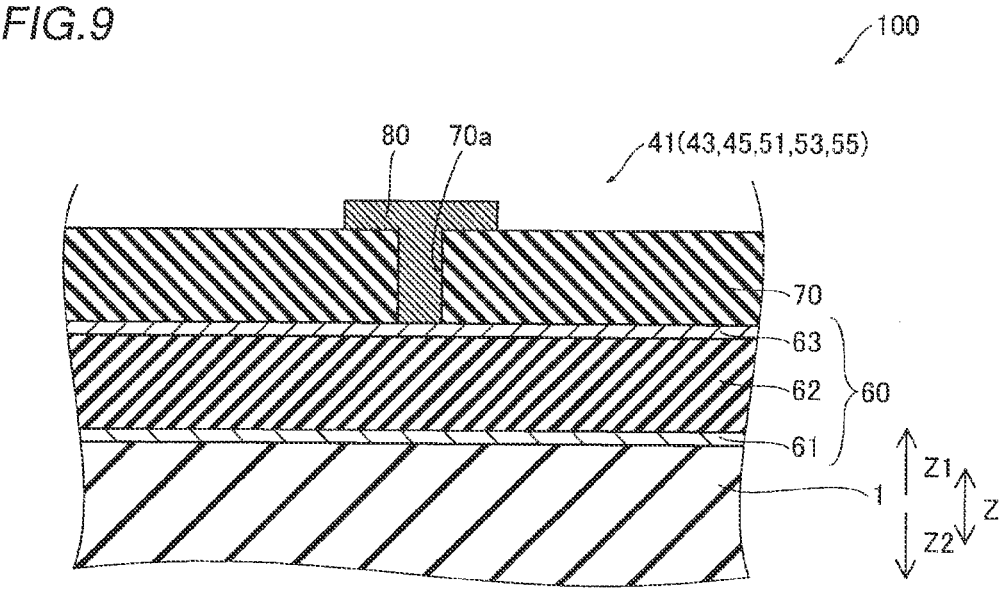
FIG. 9 An enlarged sectional view showing the upper surface side of a driving portion of the vibrating mirror element according to the embodiment of the present invention.
Figure 12:
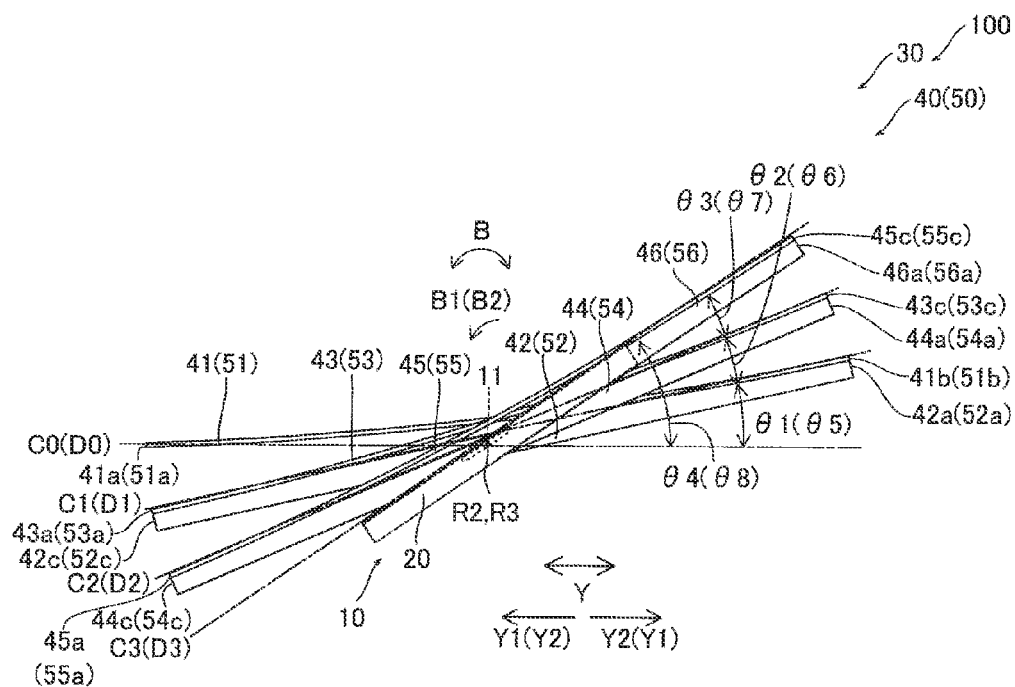
FIG. 12 A side elevational view showing the state where the vibrating mirror element according to the embodiment of the present invention is inclined at the prescribed inclination angle.
Figure 13:
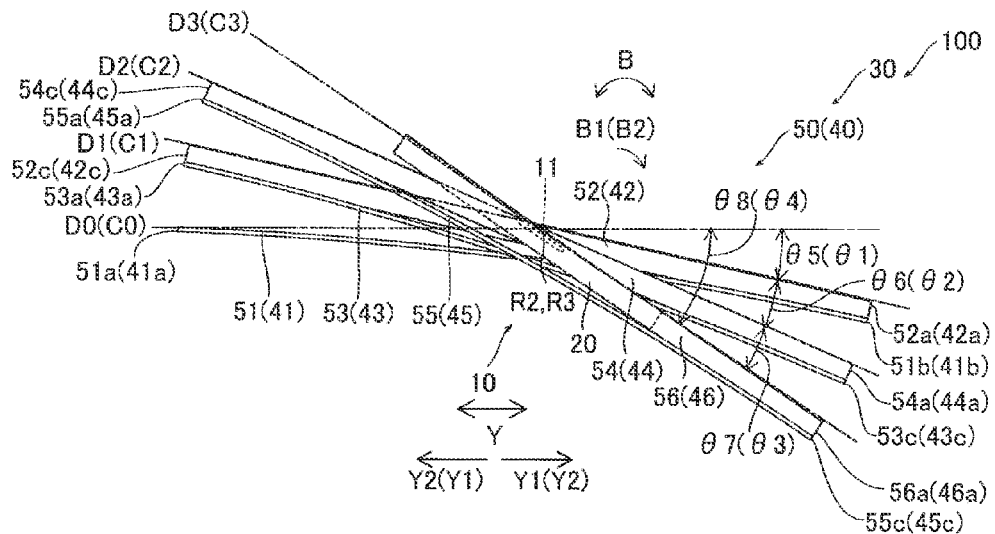
FIG. 13 A side elevational view showing the state where the vibrating mirror element according to the embodiment of the present invention is inclined at the prescribed inclination angle.
Figure 15:
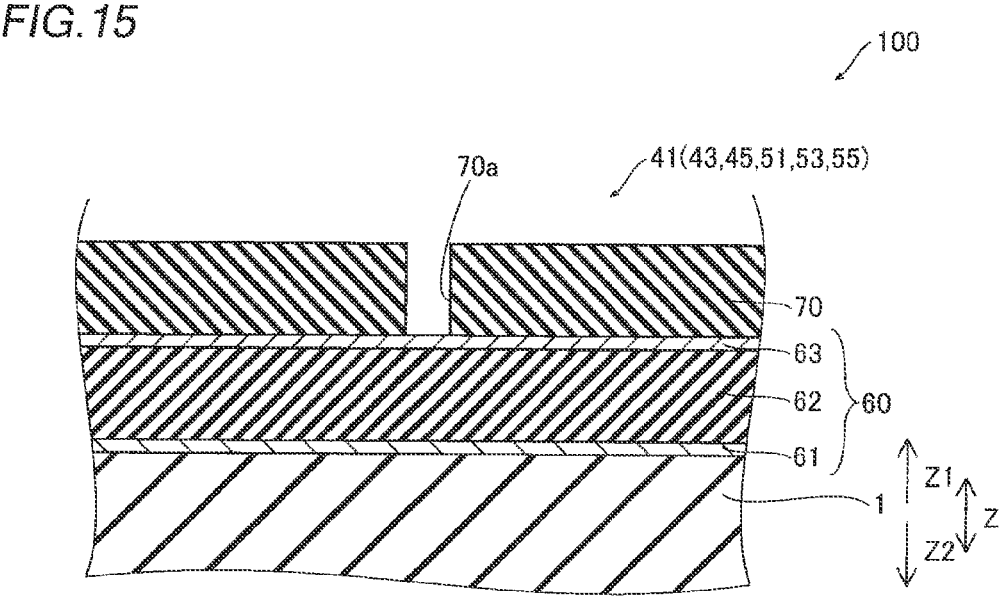
FIG. 15 A sectional view showing a step of manufacturing the vibrating mirror element according to the embodiment of the present invention.

The piezoelectric actuator 60 has a structure obtained by stacking a lower electrode 61, a piezoelectric body 62, and an upper electrode 63 from a side (Z2 side) closer to the upper Si substrate 1, as shown in FIG. 9. The lower electrode 61 is made of Ti, Pt, or the like, and formed on the upper surface of the upper Si substrate 1. Thus, wiring on the lower electrode 61 of the piezoelectric actuator 60 can be performed with respect to an arbitrary portion of the upper Si substrate 1. The thickness of the piezoelectric actuator 60 is sufficiently small with respect to the upper Si substrate 1, and hence in FIGS. 3, 12, and 13, illustration of the piezoelectric actuator 60 formed in each of the driving portions 41, 43, 45, 51, 53, and 55 is omitted. Furthermore, the thickness of the lower electrode 61 is sufficiently small, and hence in the drawings other than FIGS. 9, 10, and 15, illustration of the lower electrode 61 formed on the upper surface of the upper Si substrate 1 is omitted.

The piezoelectric body 62 is made of lead zirconate titanate (PZT), and is so polarized in the thickness direction (direction Z) that the same expands/contracts upon voltage application. The upper electrode 63 is made of a conductive metallic material such as Al, Cr, Cu, Au, or Pt.

As shown in FIGS. 5 and 9, a wiring hole 70a to connect the wiring portion 80 and the upper electrode 63 is formed in a prescribed position of the insulating layer 70 formed on the upper surface of each of the driving portions 41, 43, 45, 51, 53, and 55. A portion of the wiring portion 80 located inside the wiring hole 70a and the upper electrode 63 are connected to each other, whereby the upper electrode 63 and the wiring portion 80 are electrically connected to each other.

Figure 10:
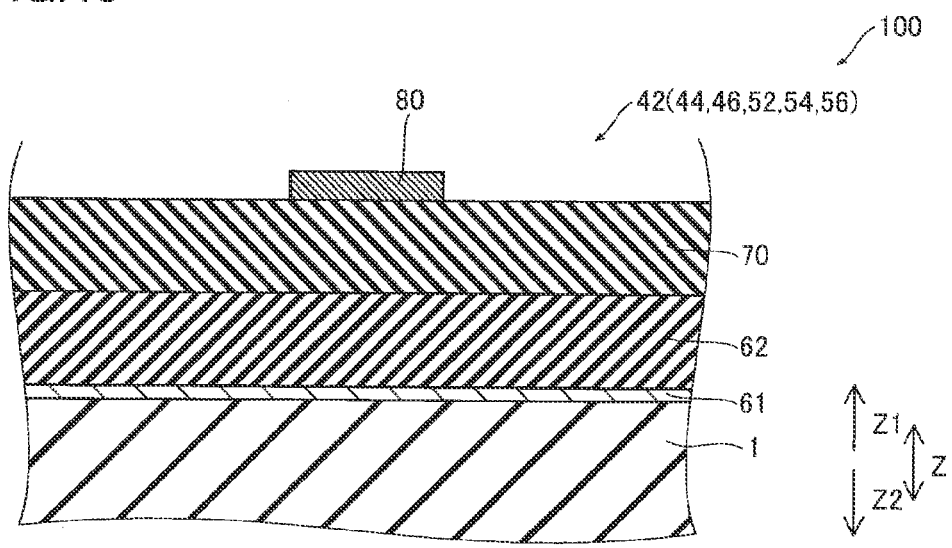
FIG. 10 An enlarged sectional view showing the upper surface side of a coupling support portion or a mirror support portion of the vibrating mirror element according to the embodiment of the present invention.

As shown in FIG. 10, the coupling support portions 42, 44, 52, and 54 and the mirror support portions 46 and 56 each have a structure obtained by stacking a lower electrode 61, a piezoelectric body 62, an insulating layer 70, and a wiring portion 80 in this order on the upper surface (surface on the Z1 side) of the upper Si substrate 1. The wiring portion 80 is formed on a substantially central portion of each of the coupling support portions 42, 44, 52, and 54 and the mirror support portions 46 (see FIG. 6) and 56 (see FIG. 7) in the direction X, as shown in FIGS. 4 and 6 to 8, and formed to extend in the direction Y. The total thickness of the lower electrode 61, the piezoelectric body 62, the insulating layer 70, and the wiring portion 80 in each of the coupling support portions 42, 44, 52, and 54 and the mirror support portions 46 and 56 is small as compared with the thickness t1 of the upper Si substrate 1 and the thickness (t2−t1) of the lower Si substrate 3, and hence the thickness of each of the coupling support portions 42, 44, 52, and 54 and the mirror support portions 46 and 56 is substantially equal to the total thickness t2 of the upper Si substrate 1 and the lower Si substrate 3.

As shown in FIGS. 6 and 7, the wiring portions 80 on the upper surfaces (surfaces on the Z1 side) of the support portions (the coupling support portions and the mirror support portions) and the wiring portions 80 on the upper surfaces of the driving portions are connected to each other on the connecting portions on the Y1 side and the connecting portions on the Y2 side. Specifically, as shown in FIG. 6, on the Y2 side (see FIG. 2), the wiring portions 80 are connected to each other on the upper surfaces of the connecting portion 41c of the driving portion 41 and the connecting portion 42b of the coupling support portion 42, the wiring portions 80 are connected to each other on the upper surfaces of the connecting portion 43d of the driving portion 43 and the connecting portion 44b of the coupling support portion 44, and the wiring portions 80 are connected to each other on the upper surfaces of the connecting portion 45d of the driving portion 45 and the connecting portion 46b of the mirror support portion 46. Furthermore, on the Y2 side, the wiring portions 80 are connected to each other on the upper surfaces of the connecting portion 52d of the coupling support portion 52 and the connecting portion 53b of the driving portion 53, and the wiring portions 80 are connected to each other on the upper surfaces of the connecting portion 54d of the coupling support portion 54 and the connecting portion 55b of the driving portion 55.

As shown in FIG. 7, on the Y1 side (see FIG. 2), the wiring portions 80 are connected to each other on the upper surfaces of the connecting portion 42d of the coupling support portion 42 and the connecting portion 43b of the driving portion 43, and the wiring portions 80 are connected to each other on the upper surfaces of the connecting portion 44d of the coupling support portion 44 and the connecting portion 45b of the driving portion 45. Furthermore, on the Y1 side, the wiring portions 80 are connected to each other on the upper surfaces of the connecting portion 41c of the driving portion 51 and the connecting portion 52b of the coupling support portion 52, the wiring portions 80 are connected to each other on the upper surfaces of the connecting portion 53d of the driving portion 53 and the connecting portion 54b of the coupling support portion 54, and the wiring portions 80 are connected to each other on the upper surfaces of the connecting portion 55d of the driving portion 55 and the connecting portion 56b of the mirror support portion 56. Thus, the same voltage is applied to the driving unit 40 (driving portions 41, 43, and 45) through the wiring portions 80 formed on the upper surface of the driving unit 40 while the same voltage is applied to the driving unit 50 (driving portions 51, 53, and 55) through the wiring portions 80 formed on the upper surface of the driving unit 50.

The driving unit 40 is electrically connected with the inner driving portion 16 of the X-directional optical scanning portion 10 through the wiring portion 80 formed on the upper surface of the mirror support portion 46, whereby a voltage can be applied to the inner driving portion 16 through the wiring portion 80 formed on the upper surface of the mirror support portion 46. Similarly, the driving unit 50 is electrically connected with the inner driving portion 17 of the X-directional optical scanning portion 10 through the wiring portion 80 formed on the upper surface of the mirror support portion 56, whereby a voltage can be applied to the inner driving portion 17 through the wiring portion 80 formed on the upper surface of the mirror support portion 56. The thickness of each of the wiring portions 80 is sufficiently small, and hence in FIGS. 1 to 3 and 11 to 14, illustration of the wiring portions 80 formed in the driving portions 41, 43, 45, 51, 53, and 55, the coupling support portions 42, 44, 52, and 54, and the mirror support portions 46 and 56 is omitted.

Next, the driving operation of the Y-directional optical scanning portion 30 of the vibrating mirror element 100 according to the embodiment of the present invention is described with reference to FIGS. 1, 3, and 11 to 14.

Figure 11:
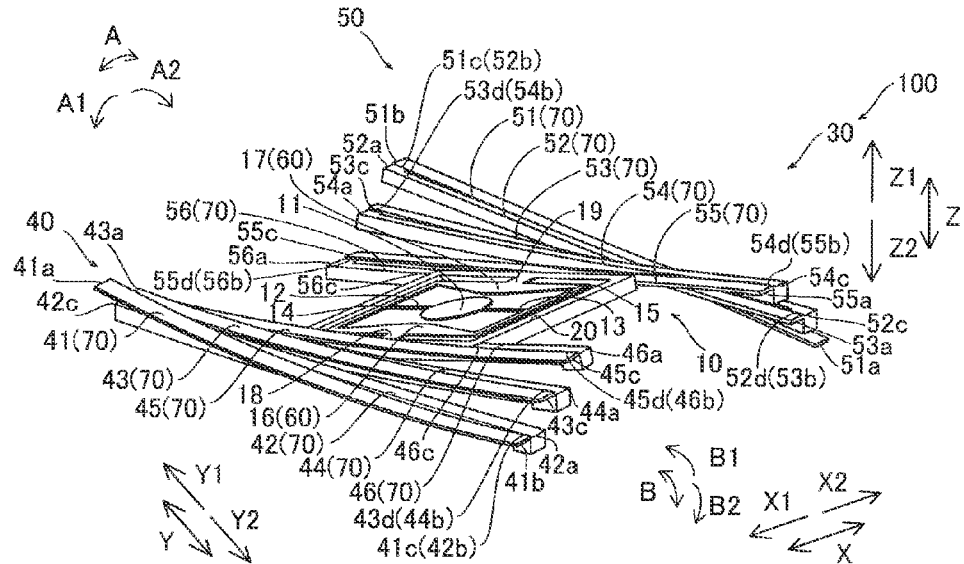
FIG. 11 A perspective view showing a state where the vibrating mirror element according to the embodiment of the present invention is inclined at a prescribed inclination angle along arrow B1.

From the state where the driving portions 41, 43, 45, 51, 53, and 55 are not driven to be kept horizontal as shown in FIGS. 1 and 3, a voltage for contracting the upper surface side (Z1 side) of the piezoelectric actuators 60 beyond the lower surface side (Z2 side) is applied to the driving portions 41, 43, and 45 of the driving unit 40, as shown in FIG. 11. On the other hand, another voltage, opposite in phase to the voltage applied to the driving portions 41, 43, and 45, for contracting the lower surface side of the piezoelectric actuators 60 beyond the upper surface side is applied to the driving portions 51, 53, and 55 of the driving unit 50.

Thus, as shown in FIG. 12, in the driving portions 41, 43, and 45, the end portions 41b, 43c, and 45c on the Y2 side are located above (Z1 side) the end portions 41a, 43a, and 45a on the Y1 side, respectively, whereby the driving portions 41, 43, and 45 are flexurally deformed to bow upward. At this time, the end portion 41b of the driving portion 41 is inclined along arrow B1 to have the first inclination angle $\theta 1$ on the Z1 side with respect to the tangent line C0. The end portion 43c of the driving portion 43 is inclined along arrow B1 to have the second inclination angle $\theta 2$ on the Z1 side with respect to the tangent line C1. The end portion 45c of the driving portion 45 is inclined along arrow B1 to have the third inclination angle $\theta 3$ on the Z1 side with respect to the tangent line C2. Consequently, the mirror support portion 46 is inclined along arrow B1 to have the fourth inclination angle $\theta 4$ (=$\theta 1$+$\theta 2$+$\theta 3$) obtained by adding the first inclination angle $\theta 1$, the second inclination angle $\theta 2$, and the third inclination angle $\theta 3$ on the Z1 side with respect to the tangent line C0 (located on the horizontal plane).

On the other hand, as shown in FIG. 13, in the driving portions 51, 53, and 55, the end portions 51b, 53c, and 55c on the Y1 side are located below (Z2 side) the end portions 51a, 53a, and 55a on the Y2 side, respectively, whereby the driving portions 51, 53, and 55 are flexurally deformed to bow downward. At this time, the end portion 51b of the driving portion 51 is inclined along arrow B1 to have the fifth inclination angle $\theta 5$ on the Z2 side with respect to the tangent line D0. The end portion 53c of the driving portion 53 is inclined along arrow B1 to have the sixth inclination angle $\theta 6$ on the Z2 side with respect to the tangent line D1. The end portion 55c of the driving portion 55 is inclined along arrow B1 to have the seventh inclination angle $\theta 7$ on the Z2 side with respect to the tangent line D2. Consequently, the mirror support portion 56 is inclined along arrow B1 to have the eighth inclination angle $\theta 8$ (=$\theta 5$+$\theta 6$+$\theta 7$) obtained by adding the fifth inclination angle $\theta 5$, the sixth inclination angle $\theta 6$, and the seventh inclination angle $\theta 7$ on the Z2 side with respect to the tangent line D0 (located on the horizontal plane).

The first inclination angle $\theta 1$ and the fifth inclination angle $\theta 5$ are substantially equal to each other, the second inclination angle $\theta 2$ and the sixth inclination angle $\theta 6$ are substantially equal to each other, and the third inclination angle $\theta 3$ and the seventh inclination angle $\theta 7$ are substantially equal to each other. Therefore, the fourth inclination angle $\theta 4$ (=$\theta 1$+$\theta 2$+$\theta 3$) and the eighth inclination angle $\theta 8$ (=$\theta 5$+$\theta 6$+$\theta 7$) are substantially equal to each other.

Consequently, as shown in FIG. 11, the mirror support portion 46 is inclined along arrow B1 while the same maintains the fourth inclination angle $\theta 4$ (see FIG. 12) on the Z1 side with respect to the tangent line C0 (see FIG. 12) and itself is unbowed. On the other hand, the mirror support portion 56 is inclined along arrow B1 while the same maintains the eighth inclination angle $\theta 8$ (=$\theta 4$) (see FIG. 13) on the Z2 side with respect to the tangent line D0 (see FIG. 13) and itself is unbowed. Thus, the X-directional optical scanning portion 10 (mirror 11) supported by the mirror support portion 46 on the X1 side and the Y2 side and supported by the mirror support portion 56 on the X2 side and the Y1 side is inclined along arrow B1 with respect to the horizontal plane including the tangent lines C0 and D0. At this time, the X-directional optical scanning portion 10, the mirror support portion 46, and the mirror support portion 56 are located substantially in the same plane while the same are inclined along arrow B1.

Figure 14:
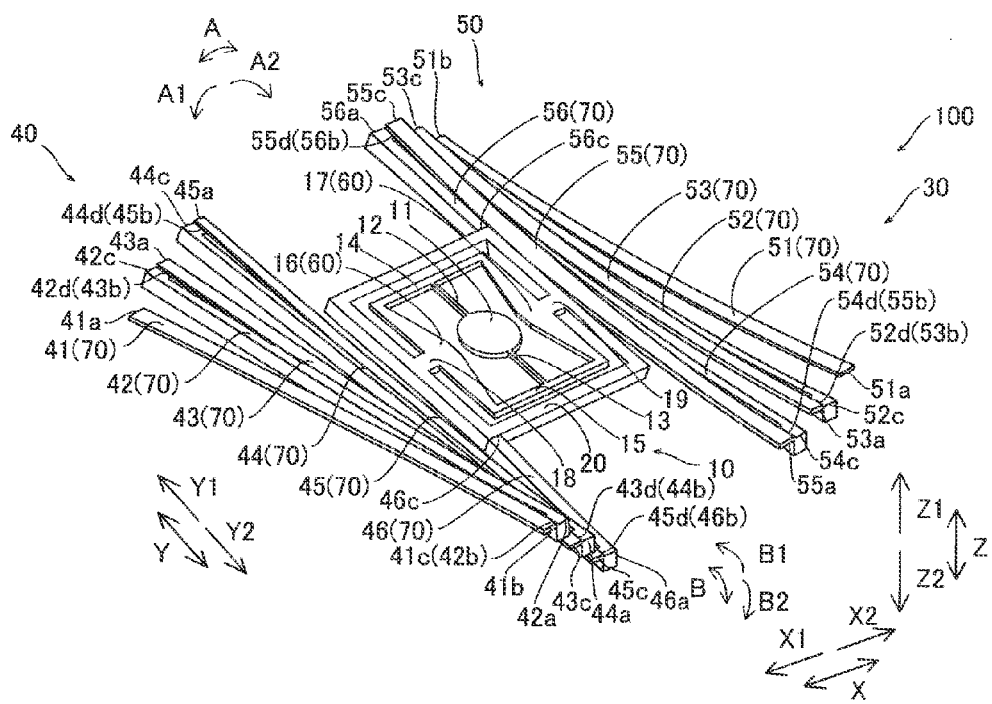
FIG. 14 A perspective view showing a state where the vibrating mirror element according to the embodiment of the present invention is inclined at a prescribed inclination angle along arrow B2.

As shown in FIG. 14, a voltage for contracting the lower surface side (Z2 side) of the piezoelectric actuators 60 beyond the upper surface side (Z1 side) is applied to the driving portions 41, 43, and 45 of the driving unit 40. On the other hand, another voltage, opposite in phase to the voltage applied to the driving portions 41, 43, and 45, for contracting the upper surface side of the piezoelectric actuators 60 beyond the lower surface side is applied to the driving portions 51, 53, and 55 of the driving unit 50.

Thus, as shown in FIG. 13, in the driving portions 41, 43, and 45, the end portions 41b, 43c, and 45c on the Y2 side are located below (Z2 side) the end portions 41a, 43a, and 45a on the Y1 side, respectively, whereby the driving portions 41, 43, and 45 are flexurally deformed to bow downward. At this time, the end portion 41b of the driving portion 41 is inclined along arrow B2 to have the first inclination angle $\theta 1$ on the Z2 side with respect to the tangent line C0. The end portion 43c of the driving portion 43 is inclined along arrow B2 to have the second inclination angle $\theta 2$ on the Z2 side with respect to the tangent line C1. The end portion 45c of the driving portion 45 is inclined along arrow B2 to have the third inclination angle $\theta 3$ on the Z2 side with respect to the tangent line C2. Consequently, the mirror support portion 46 is inclined along arrow B2 to have the fourth inclination angle $\theta 4$ (=$\theta 1$+$\theta 2$+$\theta 3$) obtained by adding the first inclination angle $\theta 1$, the second inclination angle $\theta 2$, and the third inclination angle $\theta 3$ on the Z2 side with respect to the tangent line C0 (located on the horizontal plane).

On the other hand, as shown in FIG. 12, in the driving portions 51, 53, and 55, the end portions 51b, 53c, and 55c on the Y1 side are located above (Z1 side) the end portions 51a, 53a, and 55a on the Y2 side, respectively, whereby the driving portions 51, 53, and 55 are flexurally deformed to bow upward. At this time, the end portion 51b of the driving portion 51 is inclined along arrow B2 to have the fifth inclination angle $\theta 5$ on the Z1 side with respect to the tangent line D0. The end portion 53c of the driving portion 53 is inclined along arrow B2 to have the sixth inclination angle $\theta 6$ on the Z1 side with respect to the tangent line D1. The end portion 55c of the driving portion 55 is inclined along arrow B2 to have the seventh inclination angle $\theta 7$ on the Z1 side with respect to the tangent line D2. Consequently, the mirror support portion 56 is inclined along arrow B2 to have the eighth inclination angle $\theta 8$ (=$\theta 5$+$\theta 6$+$\theta 7$) obtained by adding the fifth inclination angle $\theta 5$, the sixth inclination angle $\theta 6$, and the seventh inclination angle $\theta 7$ on the Z1 side with respect to the tangent line D0 (located on the horizontal plane). As described above, the fourth inclination angle $\theta 4$ and the eighth inclination angle $\theta 8$ are substantially equal to each other.

Consequently, as shown in FIG. 14, the mirror support portion 46 is inclined along arrow B2 while the same maintains the fourth inclination angle $\theta 4$ (see FIG. 13) on the Z2 side with respect to the tangent line C0 (see FIG. 13) and itself is unbowed. On the other hand, the mirror support portion 56 is inclined along arrow B2 while the same maintains the eighth inclination angle $\theta 8$ (=$\theta 4$) (see FIG. 12) on the Z1 side with respect to the tangent line D0 (see FIG. 12) and itself is unbowed. Thus, the X-directional optical scanning portion 10 (mirror 11) is inclined along arrow B2 at the inclination angle $\theta 4$ with respect to the horizontal plane including the tangent lines C0 and D0. At this time, the X-directional optical scanning portion 10, the mirror support portion 46, and the mirror support portion 56 are located substantially in the same plane while the same are inclined along arrow B2.

Furthermore, a voltage is so applied to the driving portions 41, 43, 45, 51, 53, and 55 of the Y-directional optical scanning portion 30 that the driving portions 41, 43, 45, 51, 53, and 55 nonresonantly drive the mirror 11 to repeat a state where the upper surface side (Z1 side) of the piezoelectric actuators 60 is contracted beyond the lower surface side (Z2 side) and a state where the lower surface side is contracted beyond the upper surface side at a frequency of about 60 Hz. Thus, a state where the X-directional optical scanning portion 10 (mirror 11) is inclined along arrow B1 as shown in FIG. 11 and a state where the X-directional optical scanning portion 10 (mirror 11) is inclined along arrow B2 as shown in FIG. 14 are repeated. Thus, the Y-directional optical scanning portion 30 inclines the mirror 11 in the direction B about the rotation center R2 and optically scans the object in the unshown direction Y.

Next, steps of manufacturing the vibrating mirror element 100 according to the embodiment of the present invention are described with reference to FIGS. 2, 8 to 10, and 15 to 17. FIG. 15 is an enlarged sectional view showing the upper surface side of the driving portion 41, 43, 45, 51, 53, or 55, and FIGS. 16 and 17 are sectional views taken along the line 5000-5000 shown in FIG. 2.

First, an SOI substrates 4 (see FIG. 16) having the upper Si substrate 1, the SiO$_2$ layer 2 (see FIG. 16) formed on the lower surface (on the Z2 side) of the upper Si substrate 1, and the lower Si substrate 3 (see FIG. 16) formed on the lower surface of the SiO$_2$ layer 2 is prepared, as shown in FIG. 15. Then, the lower electrodes 61 and the piezoelectric bodies 62 are successively formed on the entire upper surface (surface of the upper Si substrate 1 on the Z1 side) of the SOI substrate 4 by sputtering or the like. Then, the upper electrodes 63 are formed on the upper surfaces of the piezoelectric bodies 62 corresponding to the inner driving portions 16 and 17 and the driving portions 41, 43, 45, 51, 53, and 55 by vapor deposition or the like. Thus, the piezoelectric actuators 60 are formed on the inner driving portions 16 and 17 and the driving portions 41, 43, 45, 51, 53, and 55. The SiO$_2$ layer 2 is an example of the "etching stopper layer" in the present invention, and the lower Si substrate 3 is an example of the "semiconductor substrate" in the present invention.

Figure 16:
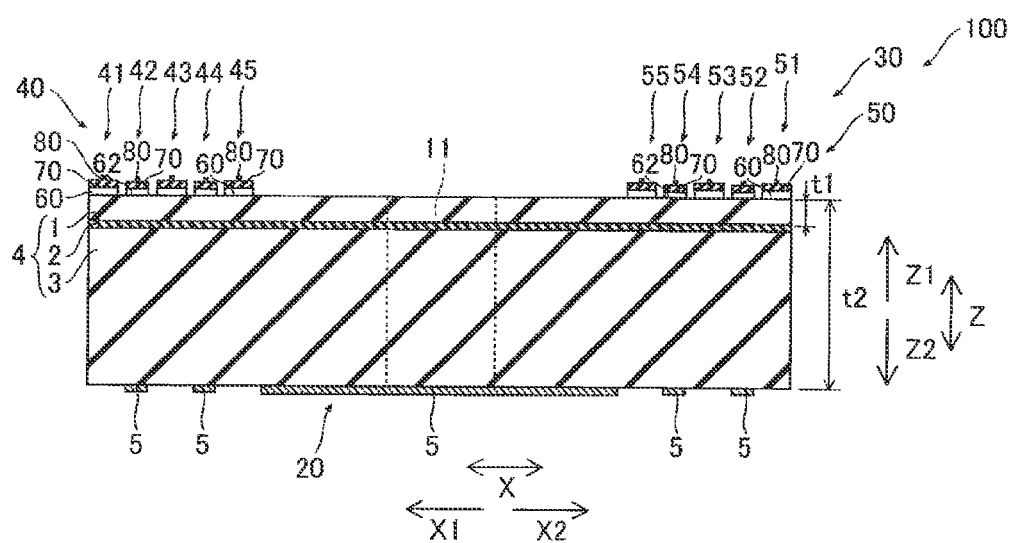
FIG. 16 A sectional view showing a step of manufacturing the vibrating mirror element according to the embodiment of the present invention.
Figure 17:
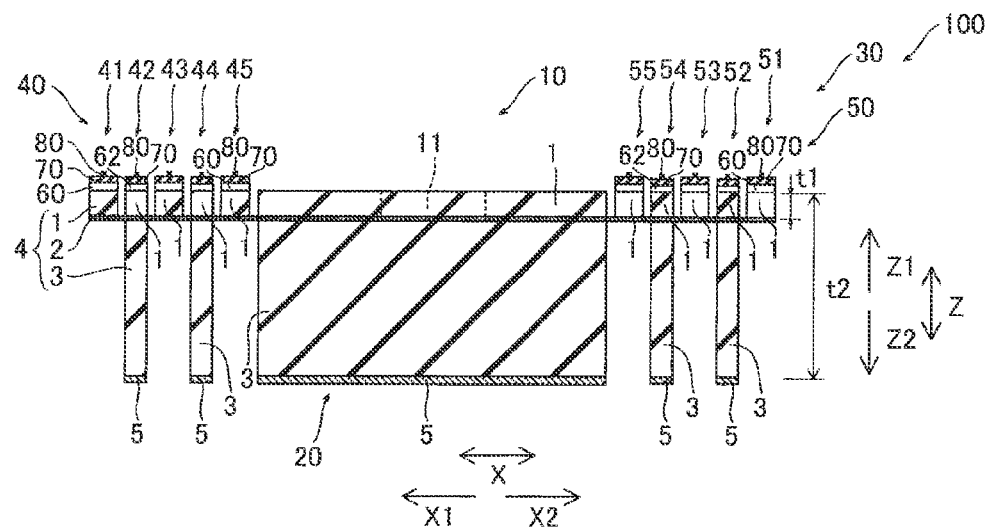
FIG. 17 A sectional view showing a step of manufacturing the vibrating mirror element according to the embodiment of the present invention.

Then, as shown in FIG. 16, resist patterns (not shown) are formed in positions other than positions corresponding to the upper surfaces of the upper electrodes 63 corresponding to the driving portions 41, 43, 45, 51, 53, and 55, the upper surfaces of the piezoelectric bodies 62 corresponding to the coupling support portions 42, 44, 52, and 54, and the upper surfaces of the piezoelectric bodies 62 corresponding to the mirror support portions 46 and 56 by photolithography, and thereafter the insulating layers 70 are formed on the upper surfaces of the upper electrodes 63 corresponding to the driving portions 41, 43, 45, 51, 53, and 55, the upper surfaces of the piezoelectric bodies 62 corresponding to the coupling support portions 42, 44, 52, and 54, and the upper surfaces of the piezoelectric bodies 62 corresponding to the mirror support portions 46 and 56. At this time, the wiring holes 70$a$ to connect the wiring portions 80 and the upper electrodes 63 are also formed simultaneously in prescribed positions of the upper surfaces of the driving portions 41, 43, 45, 51, 53, and 55, as shown in FIG. 15.

Then, the wiring portions 80 are formed on the upper surfaces of the insulating layers 70 corresponding to the driving portions 41, 43, 45, 51, 53, and 55, the coupling support portions 42, 44, 52, and 54, and the mirror support portions 46 and 56 by vapor deposition or the like, as shown in FIGS. 9 and 10. At this time, the wiring portions 80 are located inside the wiring holes 70$a$ of the driving portions 41, 43, 45, 51, 53, and 55, as shown in FIG. 9, whereby the wiring portions 80 and the upper electrodes 63 are electrically connected to each other.

Then, resist patterns (not shown) are formed in positions corresponding to the inner driving portions 16 and 17, the driving portions 41, 43, 45, 51, 53, and 55, the coupling support portions 42, 44, 52, and 54, and the mirror support portions 46 and 56 by photolithography, and wet etching or the like is thereafter performed through the resist patterns serving as masks, thereby removing portions of the piezoelectric bodies 62 formed in positions other than positions corresponding to the inner driving portions 16 and 17, the driving portions 41, 43, 45, 51, 53, and 55, the coupling support portions 42, 44, 52, and 54, and the mirror support portions 46 and 56, as shown in FIG. 16. Thereafter, mask patterns 5 made of Al, Cr, Cu, Au, Pt, or the like are formed in positions of the lower surface (surface of the lower Si substrate 3 on the Z2 side) of the SOI substrate 4 corresponding to the frame body 20, the unshown outer frame body, the coupling support portions 42, 44, 52, and 54, and the mirror support portions 46 and 56 by vapor deposition or the like.

Then, a resist pattern (not shown) is formed in a position corresponding to the vibrating mirror element 100 by photolithography and thereafter employed as a mask to remove portions of the lower electrodes 61 (see FIG. 15) formed in positions other than the position corresponding to the vibrating mirror element 100 by wet etching or the like. Thus, the lower electrode 61 is formed only on the upper surface (surface on the Z1 side) of the upper Si substrate 1 forming the vibrating mirror element 100.

Thereafter, portions of the upper Si substrate 1 formed in positions other than the position corresponding to the vibrating mirror element 100 are removed by reactive ion etching (RIE) or the like, as shown in FIG. 17. Then, the mask patterns 5 are employed as masks to remove portions of the lower Si substrate 3 formed in positions other than positions corresponding to the frame body 20, the unshown outer frame body, the coupling support portions 42, 44, 52, and 54, and the mirror support portions 46 and 56 from a side (Z2 side) opposite to a side formed with a vibrating mirror element portion until the SiO$_2$ layer 2 by reactive ion etching (RIE). Thus, the lower Si substrate 3 is removed by about 0.4 mm (t2−t1) that is the thickness of the lower Si substrate 3 in the direction Z in positions corresponding to the driving portions 41, 43, 45, 51, 53, and 55, whereby the thickness t2 of each of the coupling support portions 42, 44, 52, and 54 and the mirror support portions 46 and 56 in the direction Z is rendered larger than the thickness t1 of each of the driving portions 41, 43, 45, 51, 53, and 55 in the direction Z.

Thereafter, portions of the SiO$_2$ layer 2 exposed on the side (Z2 side) opposite to the side formed with the vibrating mirror element portion are removed by reactive ion etching (RIE). Thus, portions of the SiO$_2$ layer 2 formed in positions corresponding to the driving portions 41, 43, 45, 51, 53, and 55 are removed. At this time, the coupling support portions 42, 44, 52, and 54, the mirror support portions 46 and 56, and the driving portions 41, 43, 45, 51, 53, and 55 are so formed that the width W2 (see FIG. 2) of each of the coupling support portions 42, 44, 52, and 54 and the mirror support portions 46 and 56 in the direction X is smaller than the width W1 (see FIG. 2) of each of the driving portions 41, 43, 45, 51, 53, and 55 in the direction X. Thus, the vibrating mirror element 100 having the driving portions 41, 43, 45, 51, 53, and 55, the coupling support portions 42, 44, 52, and 54, and the mirror support portions 46 and 56 integrally formed on the upper Si substrate 1 is formed, as shown in FIG. 8.

According to this embodiment, as hereinabove described, the thickness t2 of each of the coupling support portions 42, 44, 52, and 54 and the mirror support portions 46 and 56 in the direction Z is rendered larger than the thickness t1 of each of the driving portions 41, 43, 45, 51, 53, and 55 in the direction Z. Thus, the rigidity of the coupling support portions 42, 44, 52, and 54 and the mirror support portions 46 and 56 can be increased due to the thickness t2 of each of the coupling support portions 42, 44, 52, and 54 and the mirror support portions 46 and 56 in the direction Z larger than the thickness t1 of each of the driving portions 41, 43, 45, 51, 53, and 55 in the direction Z, and hence the coupling support portions 42, 44, 52, and 54 and the mirror support portions 46 and 56 can be inhibited from flexural deformation even if the own weight of the driving portions (driving portions 41, 43, 45, 51, 53, and 55), the X-directional optical scanning portion 10 (mirror 11), or the like connected to the support portions (the coupling support portions 42, 44, 52, and 54 and the mirror support portions 46 and 56) is applied to the coupling support portions 42, 44, 52, and 54 and the mirror support portions 46 and 56. Furthermore, the thickness t2 of each of the coupling support portions 42, 44, 52, and 54 in the direction Z and the thickness t2 of each of the mirror support portions 46 and 56 in the direction Z are substantially equal to each other, whereby the vibrating mirror element 100 can be more easily formed as compared with a case where the thickness of each of the coupling support portions 42, 44, 52, and 54 and the thickness of each of the mirror support portions 46 and 56 are different from each other.

According to this embodiment, as hereinabove described, the coupling support portion 42 (52) is configured to maintain the inclination at the end portion 41b (51b) (connecting portion 41c (51c)) of the driving portion 41 (51), the coupling support portion 44 (54) is configured to maintain the inclination at the end portion 43c (53c) (connecting portion 43d (53c)) of the driving portion 43 (53), and the mirror support portion 46 (56) is configured to maintain the inclination at the end portion 45c (55c) (connecting portion 45d (55d)) of the driving portion 45 (55). Thus, while the inclinations of the coupling support portions 42 and 44 (52 and 54) and the mirror support portion 46 (56) resulting from deformation of the driving portions 41, 43, and 45 (51, 53, and 55) are maintained, the X-directional optical scanning portion 10 (mirror 11) can be inclined on the basis of the maintained inclinations of the coupling support portions 42 and 44 (52 and 54) and the mirror support portion 46 (56).

According to this embodiment, as hereinabove described, the driving portions 41, 43, 45, 51, 53, and 55 are configured to be driven by flexural deformation, and the coupling support portions 42, 44, 52, and 54 and the mirror support portions 46 and 56 are configured to be inhibited from flexural deformation. Thus, the inclinations of the driving portions 41, 43, 45, 51, 53, and 55 are maintained, whereby the coupling support portions 42, 44, 52, and 54 and the mirror support portions 46 and 56 can reliably maintain the inclinations resulting from the flexural deformation of the driving portions 41, 43, 45, 51, 53, and 55.

According to this embodiment, as hereinabove described, the driving portions 41, 43, 45, 51, 53, and 55 each include the upper Si substrate 1 having the thickness t1 of about 0.1 mm, while the coupling support portions 42, 44, 52, and 54 and the mirror support portions 46 and 56 each include the upper Si substrate 1 having the thickness t1 of about 0.1 mm, the thin $SiO_2$ layer 2 formed on the lower surface (on the Z2 side) of the upper Si substrate 1, and the lower Si substrate 3 having the thickness (t2−t1) of about 0.4 mm formed on the lower surface of the $SiO_2$ layer 2. Thus, the thickness t2 of each of the coupling support portions 42, 44, 52, and 54 and the mirror support portions 46 and 56 can be rendered larger by the thickness (t2−t1) of the lower Si substrate 3 than the thickness t1 of each of the driving portions 41, 43, 45, 51, and 55. Furthermore, the thickness t1 (about 0.1 mm) is smaller than the thickness (t2−t1) (about 0.4 mm), and hence the thickness t2 of each of the coupling support portions 42, 44, 52, and 54 and the mirror support portions 46 and 56 can be rendered much larger than the thickness t1 of each of the driving portions 41, 43, 45, 51, 53, and 55.

According to this embodiment, as hereinabove described, the vibrating mirror element 100 is so configured that the width W2 of each of the coupling support portions 42, 44, 52, and 54 and the mirror support portions 46 and 56 in the direction X is smaller than the width W1 of each of the driving portions 41, 43, 45, 51, 53, and 55 in the direction X. Thus, the overall size of the vibrating mirror element 100 in the direction X can be reduced while the thickness t2 of each of the coupling support portions 42, 44, 52, and 54 and the mirror support portions 46 and 56 in the direction Z is rendered larger than the thickness t1 of each of the driving portions 41, 43, 45, 51, 53, and 55 in the direction Z to ensure the rigidity of the coupling support portions 42, 44, 52, and 54 and the mirror support portions 46 and 56, as compared with a case where the vibrating mirror element 100 is so configured that the width W2 of each of the coupling support portions 42, 44, 52, and 54 and the mirror support portions 46 and 56 in the direction X is larger than the width W1 of each of the driving portions 41, 43, 45, 51, 53, and 55 in the direction X.

According to this embodiment, as hereinabove described, on the end portion 46c on the Y1 side, the substantially unbowed mirror support portion 46 is connected with the X-directional optical scanning portion 10 in the vicinity of the end portion on the X1 side of the side surface on the Y2 side of the frame body 20 of the X-directional optical scanning portion 10 while on the end portion 56c on the Y2 side, the substantially unbowed mirror support portion 56 is connected with the X-directional optical scanning portion 10 in the vicinity of the end portion on the X2 side of the side surface on the Y1 side of the frame body 20 of the X-directional optical scanning portion 10, whereby the state where the X-directional optical scanning portion 10 (mirror 11) is inclined can be easily maintained by the mirror support portions 46 and 56.

According to this embodiment, as hereinabove described, the driving units 40 and 50 (Y-directional optical scanning portion 30) and the X-directional optical scanning portion 10 are integrally formed on the common upper Si substrate 1. Thus, from the state where the driving portions 41, 43, 45, 51, 53, and 55, the coupling support portions 42, 44, 52, and 54, and the X-directional optical scanning portion 10 are integrally formed, portions formed with the driving portions 41, 43, 45, 51, 53, and 55 are removed by a prescribed height (t2−t1), whereby the vibrating mirror element 100 in which the thickness t2 of each of the coupling support portions 42, 44, 52, and 54 and the mirror support portions 46 and 56 in the direction Z is larger than the thickness t1 of each of the driving portions 41, 43, 45, 51, 53, and 55 in the direction Z can be easily formed. Furthermore, no connection between each portion may be made separately, and hence the steps of manufacturing the vibrating mirror element 100 can be simplified.

According to this embodiment, as hereinabove described, in the driving unit 40, the adjacent portions are alternately successively bent on the Y1 side or the Y2 side from the mirror support portion 46 on the X2 side toward the driving portion 41 on the X1 side to be connected to each other so that the portions from the mirror support portion 46 to the driving portion 41 are continuously connected, while in the driving unit 50, the adjacent portions are alternately successively bent on the Y1 side or the Y2 side from the mirror support portion 56 on the X1 side toward the driving portion 51 on the X2 side to be connected to each other so that the portions from the mirror support portion 56 to the driving portion 51 are continuously connected. Thus, the driving portion 43 can be driven on the basis of the displacement of the end portion 41b (connecting portion 41c) of the driving portion 41 while the driving portion 45 can be driven on the basis of the displacement of the end portion 43c (connecting portion 43d) of the driving portion 43. Furthermore, the driving portion 53 can be driven on the basis of the displacement of the end portion 51b (connecting portion 51c) of the driving portion 51 while the driving portion 55 can be driven on the basis of the displacement of the end portion 53c (connecting portion 53d) of the driving portion 53. Thus, the inclination angles of the mirror support portions 46 and 56 can be further increased, and hence the inclination angle of the X-directional optical scanning portion 10 (mirror 11) can be further increased.

According to this embodiment, as hereinabove described, the X-directional optical scanning portion 10 is provided with the mirror 11 and the inner driving portions 16 and 17 rotating the mirror 11 about the rotation center R1. Thus, the mirror 11 can accurately reflect light about the rotation center R2, and the vibrating mirror element 100 can two-dimensionally optically scan the object by the rotation about the rotation center R1 and the rotation about the rotation center R2.

According to this embodiment, as hereinabove described, the X-directional optical scanning portion 10 is configured to resonantly drive the mirror 11 at the resonance frequency of about 30 kHz while the Y-directional optical scanning portion 30 is configured to nonresonantly drive the mirror 11 at the frequency of about 60 Hz. Thus, the vibrating mirror element 100 can two-dimensionally optically scan the object while the X-directional optical scanning portion 10 is configured to rotate at a larger frequency about the rotation center R1 than about the rotation center R2.

According to this embodiment, as hereinabove described, the coupling support portions 42, 44, 52, and 54 and the mirror support portions 46 and 56 each are configured to have the thickness t2 in the direction Z that is substantially uniform entirely in the direction X and the direction Y. Thus, the rigidity of the coupling support portions 42, 44, 52, and 54 and the mirror support portions 46 and 56 can be kept substantially uniform entirely in the direction X and the direction Y, and hence the coupling support portions 42, 44, 52, and 54 and the mirror support portions 46 and 56 can be easily inhibited from flexural deformation.

According to this embodiment, as hereinabove described, the driving units 40 and 50 are configured to be substantially point-symmetrical to each other with respect to the center R3 of the mirror 11, whereby the X-directional optical scanning portion 10 can be supported by the driving units 40 and 50 that are substantially point-symmetrical to each other. Thus, the own weight of the X-directional optical scanning portion 10 can be evenly distributed, and hence the X-directional optical scanning portion 10 can be more reliably inclined.

According to this embodiment, as hereinabove described, the portions of the lower Si substrate 3 formed in the positions other than the positions corresponding to the frame body 20, the unshown outer frame body, the coupling support portions 42, 44, 52, and 54, and the mirror support portions 46 and 56 are removed from the side (Z2 side) opposite to the side formed with the vibrating mirror element portion until the SiO₂ layer 2 by reactive ion etching (RIE). Thus, the SiO₂ layer 2 can inhibit the vibrating mirror element portion from being etched in addition to the lower Si substrate 3.

According to this embodiment, as hereinabove described, the portions of the SiO₂ layer 2 formed in the positions corresponding to the driving portions 41, 43, 45, 51, 53, and 55 are removed by reactive ion etching (RIE). Thus, the thickness of each of the driving portions 41, 43, 45, 51, 53, and 55 can be reduced by the thickness of the removed SiO₂ layer 2, and hence the driving portions 41, 43, 45, 51, 53, and 55 can be more largely deformed.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are included.

Figure 18:
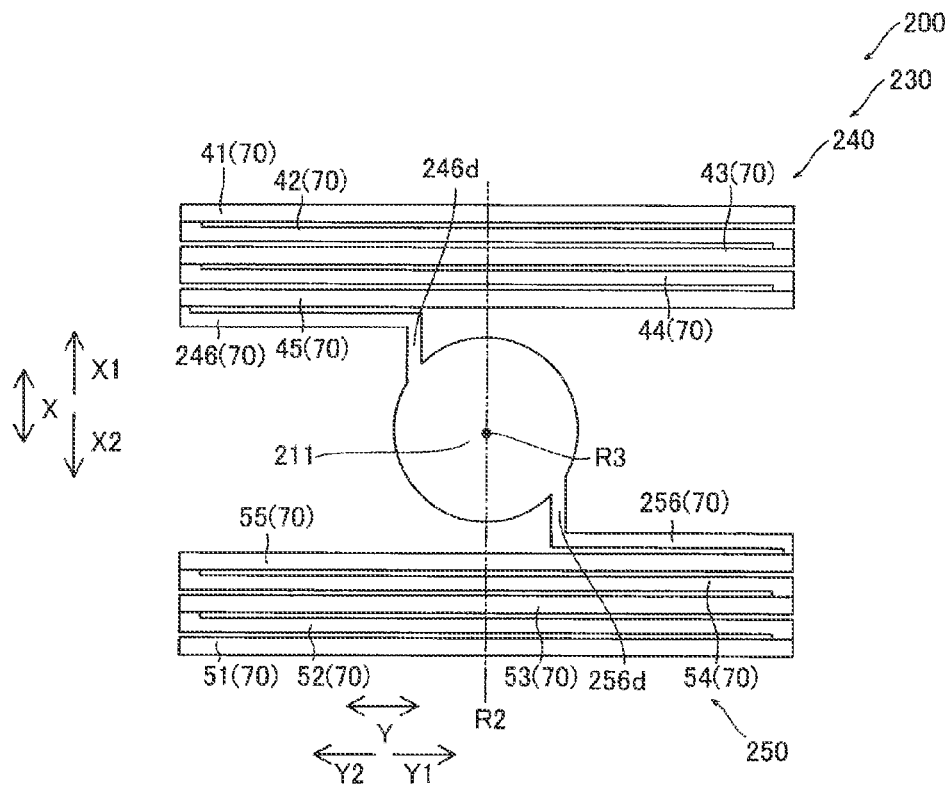
FIG. 18 A plan view showing the structure of a vibrating mirror element according to a first modification of the embodiment of the present invention.

For example, while the example in which the vibrating mirror element 100 includes the X-directional optical scanning portion and the Y-directional optical scanning portion 30 and rotates the mirror 11 in the direction A and the direction B (two-dimensionally) has been shown in the aforementioned embodiment, the present invention is not restricted to this. For example, no X-directional optical scanning portion may be provided, but a Y-directional optical scanning portion 230 and a mirror 211 may be provided to rotate the mirror 211 only in the direction B (see FIG. 1) (one-dimensionally) according to this embodiment, as in a vibrating mirror element 200 according to a first modification shown in FIG. 18. In this case, the mirror 211 is connected with an end portion 246d on a Y1 side of a mirror support portion 246 of a driving unit 240 on an X1 side and a Y2 side, and connected with an end portion 256d on the Y2 side of a mirror support portion 256 of a driving unit 250 on an X2 side and the Y1 side. Thus, the mirror 211 can be inclined in the direction B. In this case, the thickness of each of coupling support portions 42, 44, 52, and 54 and the mirror support portions 246 and 256 in the direction Z (see FIG. 1) is larger than the thickness of each of driving portions 41, 43, 45, 51, 53, and 55 in the direction Z. The mirror 211 is an example of the "mirror portion" in the present invention, and the mirror support portions 246 and 256 are examples of the "support portion" in the present invention.

Figure 19:
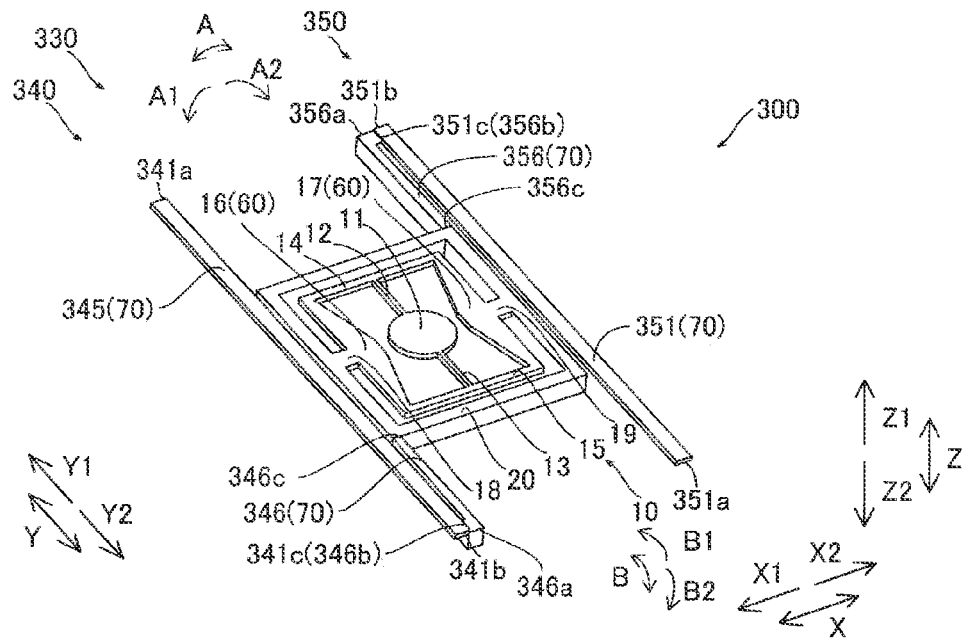
FIG. 19 A perspective view showing the structure of a vibrating mirror element according to a second modification of the embodiment of the present invention.

While the example of providing the driving portion 41, the coupling support portion 42, the driving portion 43, the coupling support portion 44, the driving portion 45, and the mirror support portion 46 in the driving unit 40 and providing the driving portion 51, the coupling support portion 52, the driving portion 53, the coupling support portion 54, the driving portion 55, and the mirror support portion 56 in the driving unit 50 has been shown in the aforementioned embodiment, the present invention is not restricted to this. For example, only a driving portion 341 and a mirror support portion 346 may be provided in the driving unit 40 while only a driving portion 351 and a mirror support portion 356 may be provided in the driving unit 50, as in a vibrating mirror element 300 according to a second modification shown in FIG. 19. In this case, the driving portion 341 is connected with a connecting portion 346b of the mirror support portion 346 on a connecting portion 341c while the driving portion 351 is connected with a connecting portion 356b of the mirror support portion 356 on a connecting portion 351c. In this case, the thickness of each of the mirror support portions 346 and 356 in a direction Z is larger than the thickness of each of the driving portions 341 and 351 in the direction Z. The driving portions 341 and 351 are examples of the "first driving portion" in the present invention, and the mirror support portions 346 and 356 are examples of the "support portion" in the present invention. The connecting portions 341c and 351c are examples of the "first connecting portion" in the present invention.

Figure 20:
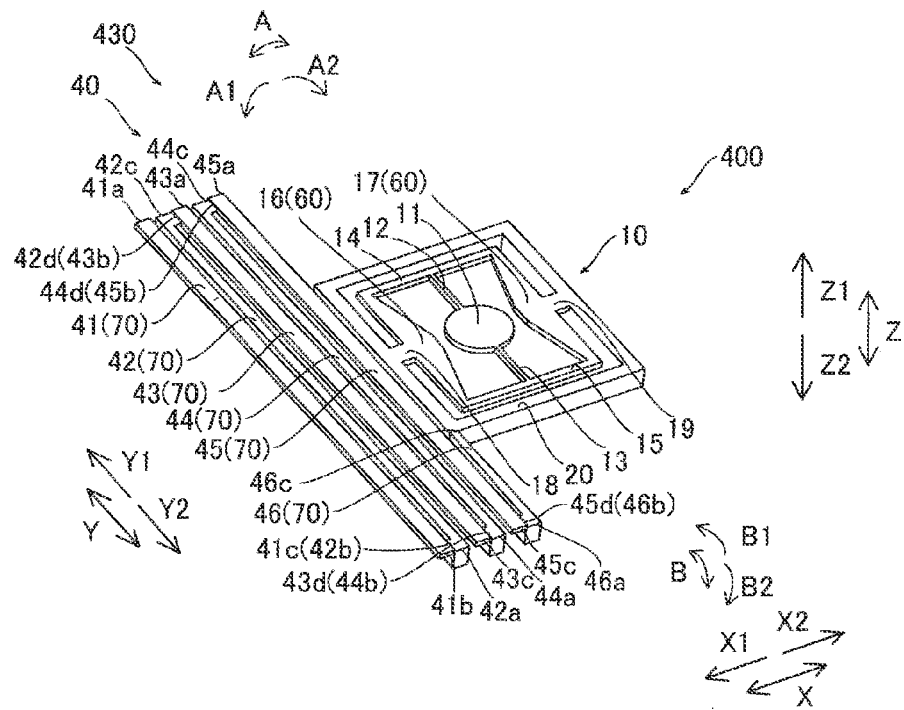
FIG. 20 A perspective view showing the structure of a vibrating mirror element according to a third modification of the embodiment of the present invention.

While the example of providing the driving unit 40 on the X1 side of the X-directional optical scanning portion 10 and providing the driving unit 50 on the X2 side of the X-directional optical scanning portion 10 in the Y-directional optical scanning portion 30 has been shown in the aforementioned embodiment, the present invention is not restricted to this. For example, in a Y-directional optical scanning portion 430, no driving unit may be provided on the X2 side of an X-directional optical scanning portion 10, but a driving unit 40 may be provided only on the X1 side of the X-directional optical scanning portion 10, as in a vibrating mirror element 400 according to a third modification shown in FIG. 20.

While the example of providing the two coupling support portions 42 and 44 and the two second driving portions (driving portions 43 and 45) between the driving portion 41 (first driving portion) and the mirror support portion 46 of the driving unit 40 and providing the two coupling support portions 52 and 54 and the two second driving portions (driving portions 53 and 55) between the driving portion 51 (first driving portion) and the mirror support portion 56 of the driving unit 50 has been shown in the aforementioned embodiment, the present invention is not restricted to this. According to the present invention, one or at least three coupling support portions and one or at least three second driving portions may be provided between the first driving portion and the mirror support portion. In this case, the thickness of each of the coupling support portions and the mirror support portion must be larger than the thickness of each of the first driving portion and the second driving portions. Furthermore, even if the number of the coupling support portions is increased, the width of each of the coupling support portions can be reduced while the thickness of each of the coupling support portions is increased to maintain the rigidity of the coupling support portions. Thus, the overall size of the vibrating mirror element can be reduced.

While the example of rendering the thickness t2 of each of the coupling support portions 42, 44, 52, and 54 and the mirror support portions 46 and 56 in the direction Z larger than the thickness t1 of each of the driving portions 41, 43, 45, 51, 53, and 55 in the direction Z by removing the lower Si substrate 3 by about 0.4 mm (t2−t1) that is the thickness of the lower Si substrate 3 in the direction Z in the positions corresponding to the driving portions 41, 43, 45, 51, 53, and 55 has been shown in the aforementioned embodiment, the present invention is not restricted to this. For example, the thickness of each of the support portions may be rendered larger than the thickness of each of the driving portions by bonding other members to portions corresponding to the support portions (the coupling support portions and the mirror support portions). Alternatively, the thickness of each of the support portions may be rendered larger than the thickness of each of the driving portions by not completely but partially removing the lower Si substrate in the thickness direction in the positions corresponding to the driving portions.

While the example of rendering the width W2 (about 0.3 mm) of each of the coupling support portions 42, 44, 52, and 54 and the mirror support portions 46 and 56 in the direction X smaller than the width W1 (about 0.4 mm) of each of the driving portions 41, 43, 45, 51, 53, and 55 in the direction X has been shown in the aforementioned embodiment, the present invention is not restricted to this. According to the present invention, the width of each of the support portions (the coupling support portions and the mirror support portions) and the width of each of the driving portions may be equal to each other.

While the example in which the coupling support portions 42, 44, 52, and 54 and the mirror support portions 46 and 56 each are configured to have the thickness t2 in the direction Z that is substantially uniform entirely in the direction X and the direction Y has been shown in the aforementioned embodiment, the present invention is not restricted to this. According to the present invention, the thickness of each of the support portions (the coupling support portions and the mirror support portions) may not be substantially uniform entirely in the direction X and the direction Y. For example, the thickness of each of the support portions in the vicinity of the first connecting portions of the driving portions may be increased to be capable of reliably maintaining the inclinations of the support portions. In this case, the thickness of each of the support portions must be larger than the thickness of each of the driving portions.

While the example in which the piezoelectric body 62 is made of lead zirconate titanate (PZT) has been shown in the aforementioned embodiment, the present invention is not restricted to this. For example, the piezoelectric body may be made of a piezoelectric material, other than PZT, consisting of an oxide mainly composed of lead, titanium and/or zirconium or another piezoelectric material. More specifically, the piezoelectric body may be made of a piezoelectric material such as zinc oxide (ZnO), lead lanthanate zirconate titanate ((Pb,La)(Zr,Ti)O$_3$), potassium niobate (KNbO$_3$), or sodium niobate (NaNbO$_3$).

While the example of continuously connecting the portions from the mirror support portion 46 to the driving portion 41 in the driving unit 40 and continuously connecting the portions from the mirror support portion 56 to the driving portion 51 in the driving unit 50 has been shown in the aforementioned embodiment, the present invention is not restricted to this. According to the present invention, the portions from the mirror support portion to the first driving portion may not be continuously connected. In this case, the thickness of each of the coupling support portions and the mirror support portions must be larger than the thickness of each of the first driving portions and the second driving portions.

While the example of providing the two coupling support portions 42 and 44 and the two second driving portions (driving portions 43 and 45) in the driving unit 40 and providing the two coupling support portions 52 and 54 and the two second driving portions (driving portions 53 and 55) in the driving unit 50 has been shown in the aforementioned embodiment, the present invention is not restricted to this. According to the present invention, the number of the coupling support portions and the number of the second driving portions provided in the driving units may be different from each other. In this case, the thickness of each of the coupling support portions and the mirror support portions must be larger than the thickness of each of the first driving portions and the second driving portions.

While the example in which the Y-directional optical scanning portion 30 is configured to nonresonantly drive the mirror 11 at the frequency of about 60 Hz has been shown in the aforementioned embodiment, the present invention is not restricted to this. According to the present invention, the Y-directional optical scanning portion may be configured to resonantly drive the mirror. Preferably, the Y-directional optical scanning portion nonresonantly drives the mirror at a frequency of at least about 30 Hz and not more than about 120 Hz.

While the example of integrally forming the driving units 40 and 50 (Y-directional optical scanning portion 30) and the X-directional optical scanning portion 10 on the common upper Si substrate 1 has been shown in the aforementioned embodiment, the present invention is not restricted to this. According to the present invention, the Y-directional optical scanning portion and the X-directional optical scanning portion may not be integrally formed, or the driving portions, the coupling support portions, and the mirror support portions of the driving units may not be integrally formed. For example, the Y-directional optical scanning portion may be formed by preparing the driving portions, the coupling support portions, and the mirror support portions separately, and thereafter bonding the same to each other.

While the example in which the inner driving portions 16 and 17 and the driving portions 41, 43, 45, 51, 53, and 55 each include the piezoelectric actuator 60 having the structure obtained by stacking the lower electrode 61, the piezoelectric body 62, and the upper electrode 63 has been shown in the aforementioned embodiment, the present invention is not restricted to this. According to the present invention, the inner driving portions and the driving portions may be configured to be driven by drivers other than the piezoelectric actuator. For example, the inner driving portions and the driving portions may be driven by drivers, made of an elastomer, held between electrodes. In this case, a voltage is so applied between the electrodes that the electrodes attract each other thereby compressing the elastomer and deforming the drivers.

The invention claimed is:

1. A vibrating mirror element comprising:
a mirror portion;
a deformable driving portion including a first connecting portion located on a first side in a first direction and linearly extending along said first direction; and
a support portion connected with said first connecting portion of said driving portion on a side of a first end portion located on said first side in said first direction and linearly extending along said first direction, wherein
said support portion includes a mirror support portion connected with said mirror portion on a side of a second end portion located on a second side in said first direction, and
a thickness of said support portion is larger than a thickness of said driving portion.

2. The vibrating mirror element according to claim 1, wherein
said support portion is configured to maintain an inclination at said first connecting portion of said driving portion when said driving portion is driven while deformed.

3. The vibrating mirror element according to claim 2, wherein
said driving portion is flexurally deformed to be driven, and
said support portion is inhibited from flexural deformation to maintain said inclination at said first connecting portion of said driving portion.

4. The vibrating mirror element according to claim 1, wherein
said support portion includes a substrate, and includes a first portion having a first thickness and a second portion having a second thickness smaller than said first thickness, formed on said substrate,
said driving portion is constituted by a third portion having said second thickness, and
said support portion is so configured that said first portion and said second portion are stacked in a thickness direction to render said thickness of said support portion larger than a thickness of said third portion of said driving portion.

5. The vibrating mirror element according to claim 1, wherein
a width of said support portion in a second direction orthogonal to said first direction is not more than a width of said driving portion in said second direction.

6. The vibrating mirror element according to claim 1, wherein
said mirror support portion is configured to be capable of supporting said mirror portion in an inclined state when said driving portion is driven.

7. The vibrating mirror element according to claim 1, wherein
said driving portion includes a first driving portion, that is cantilevered, having a fixed end on a side opposite to said first connecting portion in said first direction and a second driving portion having a second connecting portion on said side opposite to said first connecting portion in said first direction,
said support portion includes a first coupling support portion connected with said first connecting portion of said first driving portion on a side of a first end portion located on said first side in said first direction and connected with said second connecting portion of said second driving portion on a side of a second end portion located on said second side in said first direction, and
a thickness of said first coupling support portion is larger than a thickness of said first driving portion and a thickness of said second driving portion.

8. The vibrating mirror element according to claim 7, wherein
a width of said first coupling support portion in a second direction orthogonal to
said first direction is not more than a width of said first driving portion in said second direction and not more than a width of said second driving portion in said second direction.

9. The vibrating mirror element according to claim 7, wherein
said mirror support portion is configured to be capable of supporting said mirror portion in an inclined state when said driving portion is driven, said mirror support portion is configured to be connected with said first connecting portion of said second driving portion on a side of a first end portion, and
a thickness of said mirror support portion is larger than said thickness of said first driving portion and said thickness of said second driving portion.

10. The vibrating mirror element according to claim 9, wherein
a plurality of said second driving portions are provided,
said support portion includes a second coupling support portion connected with said first connecting portion of said second driving portion on a side of a first end portion located on said first side in said first direction and connected with said second connecting portion of said second driving portion different from said second driving portion connected on said side of said first end portion, on a side of a second end portion located on said second side in said first direction, and
said second driving portions and said second coupling support portions are connected to each other by alternately successively bending adjacent portions on either a first side of said first direction or a second side of thereof in a state where said second driving portions and said second coupling support portions are alternately arranged from a side of said mirror support portion toward a side of said first coupling support portion along a second direction orthogonal to said first direction, so that portions from said mirror support portion to said first coupling support portion are continuously connected, so that portions from said mirror support portion to said first driving portion are continuously connected.

11. The vibrating mirror element according to claim 1, wherein
said driving portion, said support portion, and said mirror portion are integrally formed.

12. The vibrating mirror element according to claim 1, wherein
said mirror portion is configured to rotate about a first rotation center, and
said mirror portion includes a mirror and a mirror portion-side driving portion rotating said mirror about a second rotation center orthogonal to said first rotation center in an in-plane direction of said mirror.

13. The vibrating mirror element according to claim 12, wherein
said driving portion is configured to rotate said mirror portion about said first rotation center on the basis of a first frequency, and
said mirror portion-side driving portion is configured to rotate said mirror about said second rotation center on the basis of a second frequency larger than said first frequency.

14. The vibrating mirror element according to claim 1, wherein
said thickness of said support portion is substantially constant along said first direction.

15. The vibrating mirror element according to claim 1, wherein
a pair of said driving portions are provided to hold said mirror portion therebetween,
a pair of said support portions are provided to hold said mirror portion therebetween, and
said pair of driving portions are configured to be substantially point-symmetrical to each other with respect to a center of said mirror portion, and said pair of support portions are configured to be substantially point-symmetrical to each other with respect to said center of said mirror portion.

16. A method for manufacturing a vibrating mirror element comprising a mirror portion; a deformable driving portion including a first connecting portion located on a first side in a first direction and linearly extending along said first direction; and a support portion connected with said first connecting portion of said driving portion on a side of a first end portion located on said first side in said first direction and linearly extending along said first direction, wherein said support portion includes a mirror support portion connected with said mirror portion on a side of a second end portion located on a second side in said first direction, comprising steps of:
forming a vibrating mirror element portion including said mirror portion, said driving portion and said support portion on the same substrate; and
rendering a thickness of said support portion larger than a thickness of said driving portion by removing at least part of a portion of said substrate corresponding to said driving portion.

17. The method for manufacturing a vibrating mirror element according to claim 16, wherein
said substrate comprises a semiconductor substrate, and
the step of rendering said thickness of said support portion larger than said thickness of said driving portion includes a step of removing said semiconductor substrate of said portion corresponding to said driving portion by etching.

18. The method for manufacturing a vibrating mirror element according to claim 17, wherein
the step of forming said vibrating mirror element portion on the same substrate includes a step of forming said vibrating mirror element portion on an etching stopper layer provided on said semiconductor substrate, and
the step of removing said portion corresponding to said driving portion by etching has a step of removing said semiconductor substrate of said portion corresponding to said driving portion from a side opposite to a side formed with said vibrating mirror element portion until said etching stopper layer by etching.

19. The method for manufacturing a vibrating mirror element according to claim 18, wherein
the step of removing said portion corresponding to said driving portion by etching further has a step of removing by etching said etching stopper layer of said portion corresponding to said driving portion from which said semiconductor substrate has been removed.

20. The method for manufacturing a vibrating mirror element according to claim 16, wherein
the step of forming said vibrating mirror element portion on the same substrate includes a step of forming said driving portion including a first driving portion, that is cantilevered, having a fixed end on a side opposite to said first connecting portion in said first direction and a second driving portion having a second connecting portion on said side opposite to said first connecting portion in said first direction and a step of forming said support portion including a coupling support portion connected with said first connecting portion of said first driving portion or said first connecting portion of said second driving portion on a side of a first end portion located on said first side in said first direction and connected with said second connecting portion of said second driving portion on a side of a second end portion located on said second side in said first direction, and
the step of rendering said thickness of said support portion larger than said thickness of said driving portion includes a step of rendering a thickness of said coupling support portion larger than a thickness of said first driving portion and a thickness of said second driving portion by removing at least part of portions of said substrate corresponding to said first driving portion and said second driving portion.

* * * * *